US007568771B2

(12) United States Patent
Morris

(10) Patent No.: US 7,568,771 B2
(45) Date of Patent: Aug. 4, 2009

(54) WHEEL CAP WITH COMBINED IMAGE EXHIBITING MEANS AS PERPETUALLY NON-ROTATABLE

(76) Inventor: Bruce Morris, E.4103 Rich, Spokane, WA (US) 99217

( * ) Notice: Subject to any disclaimer, the term of this patent is extended or adjusted under 35 U.S.C. 154(b) by 0 days.

(21) Appl. No.: 11/438,412

(22) Filed: May 22, 2006

(65) Prior Publication Data

US 2007/0266603 A1 Nov. 22, 2007

(51) Int. Cl.
*G09F 21/04* (2006.01)
*G09F 15/00* (2006.01)
*G09F 15/02* (2006.01)
*B60B 7/04* (2006.01)
*B60B 7/14* (2006.01)

(52) U.S. Cl. .............................. 301/37.25; 301/37.376; 301/37.36; 301/37.26; 40/591; 40/587; 40/606.02

(58) Field of Classification Search ................... 40/591, 40/587, 606.02; 301/37.25, 37.376, 37.36, 301/37.26

See application file for complete search history.

(56) References Cited

U.S. PATENT DOCUMENTS 4,138,160 A 2/1979 Lohmeyer
D372,451 S 8/1996 Miansian
D373,103 S 8/1996 Miansian
5,584,537 A 12/1996 Miansian
D379,959 S 6/1997 Miansian
D380,185 S 6/1997 Miansian
D385,247 S 10/1997 Miansian
D407,362 S 3/1999 Schardt
D415,088 S 10/1999 Schardt
D430,528 S 9/2000 Moore
D431,017 S 9/2000 Moore
D443,244 S 6/2001 Almarez
6,443,529 B1 * 9/2002 Williams ................. 301/37.25
6,517,167 B2 * 2/2003 Baker ...................... 301/37.25

* cited by examiner

*Primary Examiner*—Paul N Dickson
*Assistant Examiner*—Syed A Islam

(57) ABSTRACT

The objective of the present invention is to implement a wheel cap device including; a spindle (30) established in the centermost portion of a wire wheel cap (44) of a wire wheel; and a ornamental image (24) consisting of an aesthetic feature casted thereupon and mechanically joining with wire wheel cap (44) and encompassing a bearing assembly (32) and counterbalance (34); whereby upon wheel rotation to coordinately revolve spindle (30) fixed to wire wheel cap (44) ornamental image (24) will be situated vertically consistently relative to the rotation of the wire wheel and wire wheel cap (44) to thereby display ornamental image (24) plainly, and perceivably.

10 Claims, 28 Drawing Sheets

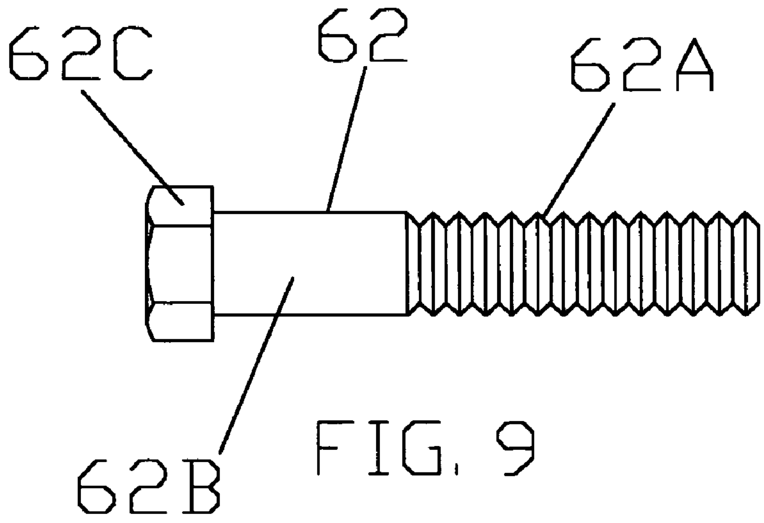
FIG. 9
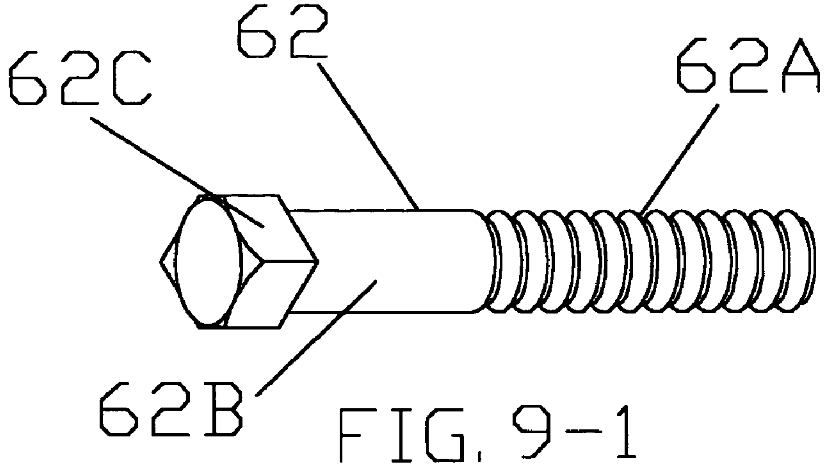
FIG. 9-1
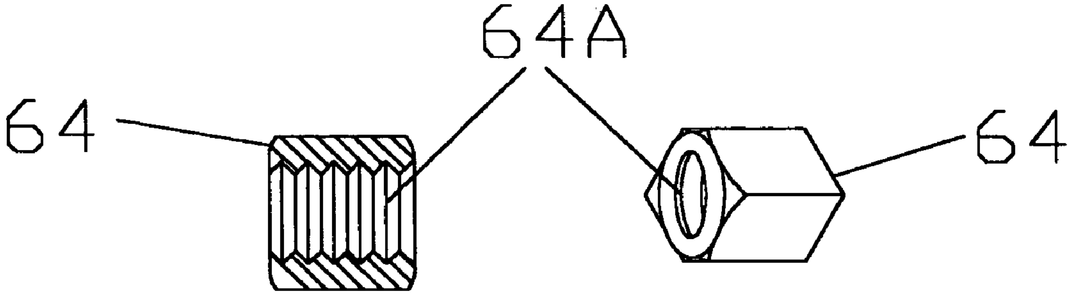
FIG. 10
FIG. 10-1

WHEEL CAP WITH COMBINED IMAGE EXHIBITING MEANS AS PERPETUALLY NON-ROTATABLE

FEDERALLY SPONSORED RESEARCH

Not Applicable

CROSS-REFERENCE TO RELATED APPLICATIONS

Not Applicable

SEQUENCE LISTING PROGRAM

Not Applicable

BACKGROUND OF THE INVENTION

1. Field of Invention

This present invention typically relates to wire wheel caps, distinctly to a wire wheel cap or spline adapter nut that encompasses a combined non-rotating asymmetrical art established image.

2. Prior Art

Vehicle wheels held in place by a decorative nut, commonly known as a wheel cap or spline adapter nut, are a well known fixture on vehicles such as sportscars, domestics, imports, and racing vehicles. Furthermore, wire-spoked, aluminum, and steel wheels have been supplied with the forementioned vehicles utilizing these decorative caps. In known wire wheel attachments, the wire wheel and decorative wheel cap have a direct mechanical connection to each other and consequently, the wire wheel cap rotates at the same revolution as the wire wheel.

Originally, these wheel caps, spinner nuts, simulated knock-offs, or spline adapter nuts were based on the concept of a design which consisted of a circular piece having two or three extensions attached to a central region. The purposes of the extensions are to fasten the wire wheel to a vehicle drum by hammering the extensions clockwise or counterclockwise to tighten or loosen the wheel cap from the wire wheel. U.S. Pat. No. 4,138,160 to Lohmeyer (1979) discloses the original type of wire wheel spinner having extensions (11) about the center portion to fasten the wheel to the automobile. U.S. Pat. No. 4,191,427 (1980) to Bradley shows a later version being based on the same concept except using set screws (17) to secure the spinner to the wheel.

Thereafter, inventors created several types of wheel spinner nuts to secure wire wheels to automobiles. U.S. Pat. No. 5,584,537 (1996) to Miansian comprises a hub adapter (10) which is used to fasten the wheel with the use of a spline adapter (32). The wheel spinner (50) is then attached to hub adapter (10) by hammering the extensions of spinner (50) in the direction needed to couple or decouple the adjoining parts. U.S. Pat. No. D.373,103 (1996), U.S. Pat. No. D.372,451 (1996), U.S. Pat. No. D.379,959 (1997), U.S. Pat. No. D.380,185 (1997), U.S. Pat. No. D.385,247 (1997) all to Miansian discloses various types of wheel spinners containing two or three extensions that consist of designs such as, batwings, blades, and a number of grooves configured along the front surface.

Following the concept of extensions about the central section of wheel spinners brought the idea of wheel spinners that, instead of utilizing extensions for fastening, used a decagon configuration along the peripheral surface for fastening the wire wheel to the vehicle, commonly called wheel caps. U.S. Pat. No. D443,244S (2001) to Almarez shows a hubcap containing a star shaped pattern along the outer portion used for attaching the wire wheel however, the direct coupling of the entire wheel cap to the wheel causes it to become obscured upon wheel rotation. U.S. Pat. No. D431,017 (2000) to Moore shows a wire wheel cap with a bullet design containing the decagon configuration commonly used for fastening the cap to the wheel however, It utilizes the same method of construction previously mentioned, enabling it the ability to remain distinctly observable during wire wheel rotation. U.S. Pat. No. D430,528 (2000) to Moore shows a wire wheel cap resembling his previous design, which is also fabricated from a solid piece of material causing it to become completely blurred during wheel rotation. U.S. Pat. No. D415,088 (1999) to Schardt shows another wire wheel cap design consisting of solid construction, thereby prohibiting the observability of the prominent section. U.S. Pat. No. D407,362 (1999) also to Schardt shows a bullet shaped wire wheel cap comprised of solid construction containing no method for freeing the front section from the corresponding wheel. All of the previously mentioned wire wheel caps that are in present day use fail to utilize any method for freeing the aesthetic section from the corresponding wire wheel. Due to being constructed from a solid piece of material, their aesthetic designs become unobservable once the wire wheel is in motion.

Other familiar wheel assemblies have utilized a bearing assembly to fully disengage wheel rotation from a fixed wheel cover, such as may be beneficial when that cover carries advertisement displays or other information, that in order to be readable to a spectator outside the vehicle, needs to be stationary when the vehicle is in motion. U.S. Pat. No. 3,722,958 (1973) to Marshall discloses a non-rotatable wheel cover (10) supported by an extending shaft (94) containing a bearing assembly that is attachable to any automobile wheel hub or lug nuts. U.S. Pat. No. 5,659,958 (1973) to Hsiao comprises an entire wheel cover (28) mounted to display indicia thereon while remaining non-rotatable upon wheel rotation by utilizing a stabilizing structure configured to operate in correlation with a counterweight. As stated earlier, it comprises an entire wheel cover. U.S. Pat. No. 5,588,715 (1996) to Harlen discloses a non-rotating wheel cover assembly including hardware (40) for mounting the wheel cover directly to a vehicle wheel allowing non-rotational support during rotation of the wheel however, it utilizes a disc or cover. U.S. Pat. No. 4,929,030 (1990) to Park discloses a stationary member on an automobile hub cap containing a static lateral axis (24) supported by a bearing (14) and a bushing (17) located at the center of the axis permitting continuous observability upon wheel rotation. Although it discloses a stationary member, it is situated upon a cover thereby making it useless for wire wheel applications. U.S. Pat. No. 5,957,542 (1999) to Boothe shows a theft-proof non-rotating wheel cover with replaceable ornament containing a base (4) which supports the device within a central cavity in an automotive wheel. A cover plate (10) is mounted with a bearing (3) and contains a weight (9) to restrict rotational motion during the rotation of the wheel axis, also being specifically designed as a wheel cover. And U.S. Pat. No. 6,848,751 (2005) to Yuan also discloses an emblem for continuous observability nevertheless, it exclusively contains a non-rotatable disk thereby consuming the entire radial section of the wheel, in turn, making it useless for wire wheel applications. Thus, the forementioned known wheels assemblies are fabricated to either fasten the wheel to an automobile resulting in the same revolutions per minute (RPM) as the wheel speed, or contrarily, to fully restrain rotation as the wheel rotates, exclusively using a non-rotatable disk or cover.

Despite the abundant arrangements and patterns of the aforementioned wheel caps and non-rotatable wheel covers, both suffer from multiple disadvantages:

(a) Wire wheel manufacturers construct wire wheel caps for the sole purpose of securing the wire wheel to the vehicle's hubs or drums. Although the prominent section, which is viewed by observers, contains a design; the fact that the design will become obscurred upon wheel rotation does not appear to be an important element in the manufacturing process.

(b) Newer designs of wire wheel caps are becoming more elaborate, in turn, requiring more time, cost, and the use of computer numerical controlled machines to construct molds consisting of greater detail.

(c) Administering great achievements towards creative designs on a wire wheel cap that revolves essentially all the time is dishearting or dispiriting for its creator.

(d) The fabrication method utilized to construct wire wheel caps from one piece of metallic material is genuine, but vintage. Being constructed from one piece of material restricts the wheel cap's performance to one main task, which is exclusively securing a wire wheel to an automobile.

(e) A wire wheel cap of the type in modern use can be stolen off a automobile due to the standard decagon configuration the outer circumference is comprised of and being constantly exposed without the use of any anti-theft defense mechanisms.

(f) The outer surface of the wire wheel caps that are in present use is limited to the plating method of chrome, gold, and powder-coating due to the designs that are offered, constricting the desire to expend the process of airbrushing, which depends upon a design to consist of extreme detail.

(g) The configurations that exist on the majority of wire wheel caps in use today are established solely on designs.

(h) Non-rotatable wheel covers that are in present use are designed to simulate a hub cap by concealing the unattractive appearance of factory wheels.

(i) Wheel covers that are in present use are designed to consume the entire radial portion of the wheel making it undesirable to owners of wire wheels and custom wheels.

However, as I am aware, no procedure has been utilized that takes advantage of the graceful dynamics that may occur if the wire wheel cap were to be constructed comprising two sections, permitting the aesthetic portion the ability to remain non-rotatable relative to the rotation of the corresponding wire wheel.

Objects and Advantages

Respectively, several objects and advantages of the present invention are:

a) To provide a wire wheel cap that is constructed using two adjoining sections making theft difficult by constructing the first section with counterbored holes for occupying tamper-proof screws.

b) To provide a wire wheel cap that comprises a bearing assembly admitting it the ability to remain non-rotatable relative to a corresponding wire wheel.

c) To provide a wire wheel cap that performs a graceful function that is not only optically pleasurable to the owner or observer outside the vehicle, but also rewards the creator with the gratification of knowing that the time, effort, and costs of creating the highly detailed image it exhibits will remain observable despite of wheel rotation and speed.

d) To provide a wire wheel cap with a highly detailed image capable of being chrome, gold, or powder coat plated, as well as qualifying the image for the precise process of airbrushing.

e) To provide a wire wheel cap which will show evidence of its creativeness to be novel by being comprised purely of highly detailed asymmetrical artistry, producing composed images that present the appearance natural expression.

f) To provide a wire wheel cap containing a non-rotatable front section being comprised of the highly detailed images previously mentioned, that present day wire wheel manufacturers have failed to offer.

SUMMARY

The objective of the present invention is to implement a wire wheel cap including; an opening established centrally in a wire wheel cap of a automobile wire wheel; and a aesthetic image casted thereupon a prominent section of a housing encompassing a bearing and counterbalance and axially joining the wheel cap to continuously gravitate pending; whereby during wheel rotation to coordinately revolve the wire wheel cap fixed on the wheel, the combined image will be continuously situated vertically relative to the corresponding rotation of the wire wheel to thereby present the image clearly.

DRAWINGS—FIGURES

FIG. 1-1 shows a rear view of housing with ornamental image.

FIG. 3-1 shows a cross sectional view of bearing assembly.

FIG. 4-1 shows a isometric view of counterbalance.

FIG. 6-1 shows a isometric view of wire wheel cap.

FIG. 6-2 shows a cross sectional view of wire wheel cap.

FIG. 6-3 shows a rear view of wire wheel cap.

FIGS. 7 to 7-1 show front and isometic views of a snap ring.

FIG. 8-1 shows a cross sectional assembled view of the ornament and wire wheel cap.

FIGS. 9 to 9-1 show side and isometric views of a bolt.

FIGS. 10 to 10-1 show isometric and cutaway views of a nut.

FIGS. 11 to 11-1 show isometric and cutaway views of a drilled bolt.

FIGS. 12 to 12-1 show isometric and cutaway views of a crowned nut.

FIGS. 16 to 6-7 show front and rear views of the ornamental image having various combinations of counterbalance housings.

FIGS. 17-1 to 17-2 show exploded and assembled cutaway views of the ornamental image constructed in accordance with the custom wheel center cap.

FIGS. 18 to 18-1 show exploded and assembled cutaway views of the ornamental image containing a alternate bolt assembly.

Figure 1:
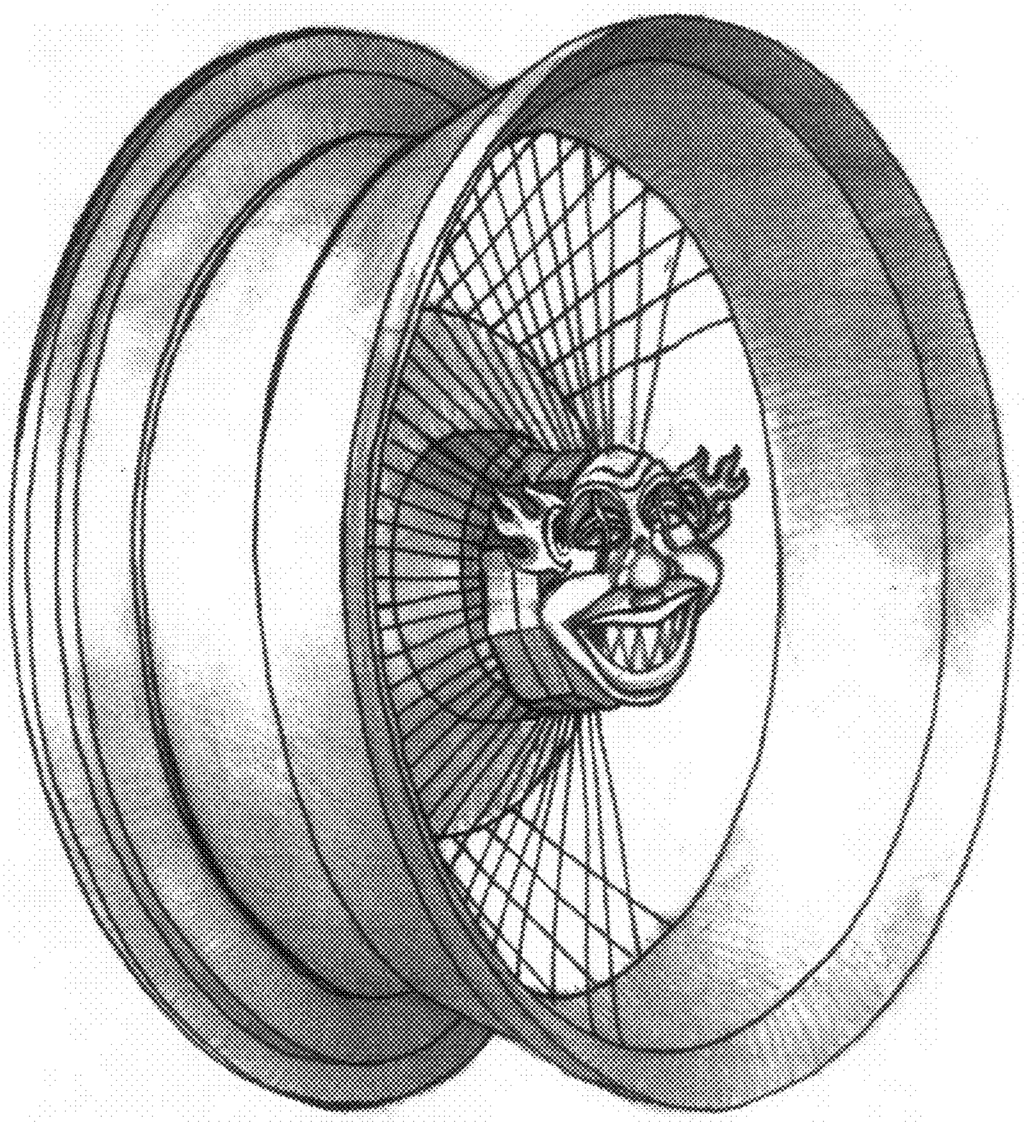
FIG. 1 shows a left side view of a housing with ornamental image.
Figure 1:
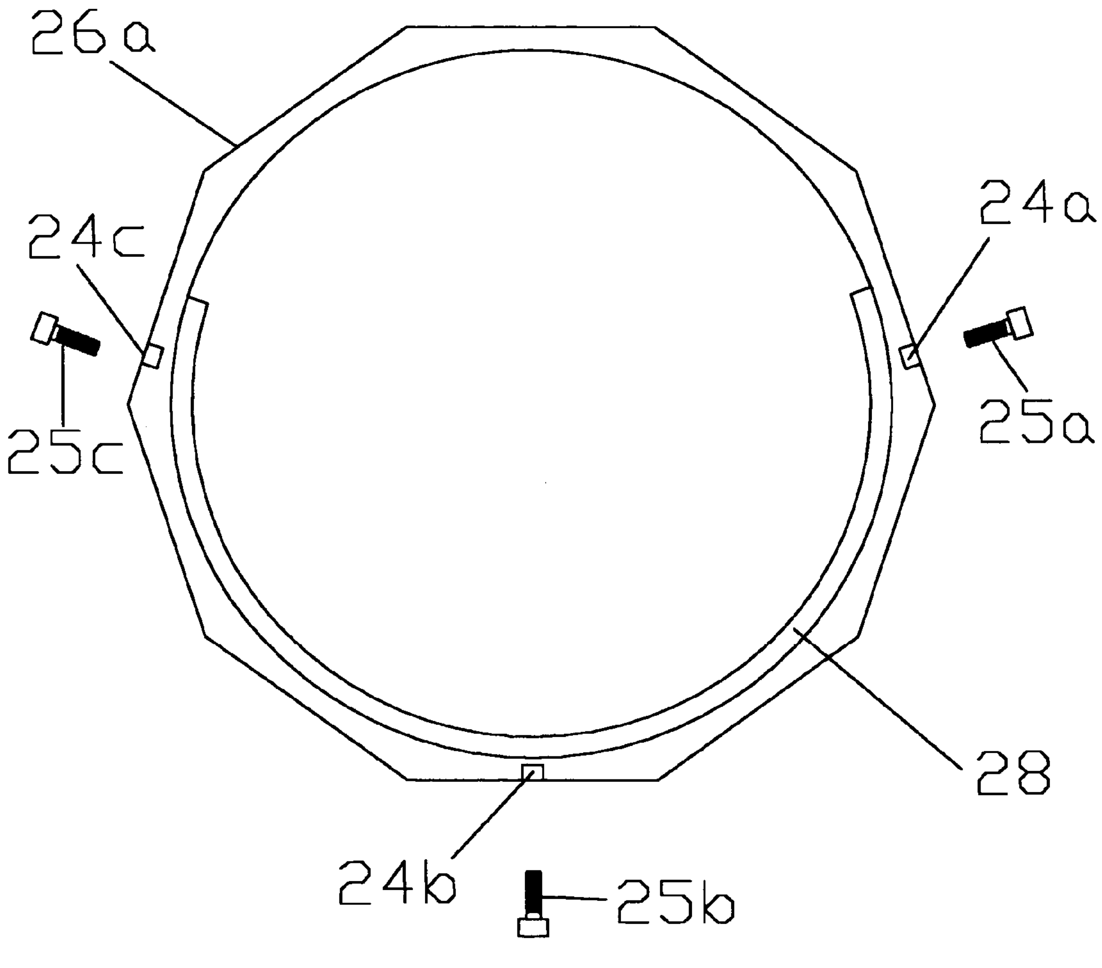

| DRAWINGS - Reference Numerals | | | |
|---|---|---|---|
| 24 | ornament | 24A | counterbored hole |
| 24B | counterbored hole | 24C | counterbored hole |
| 25A | screw | 25B | screw |
| 25C | screw | 26 | counterbalance housing |
| 26A | counterbalance housing | 26B | counterbalance housing |
| 26C | counterbalance housing | 26D | counterbalance housing |
| 28 | counterbalance rest | 30 | spindle |
| 30A | spindle head | 30B | spindle shaft |
| 30C | snap ring groove | 30D | spindle end |
| 32 | bearing assembly | 32A | large enclosure |
| 32B | ball bearing | 32C | small enclosure |
| 32L | seal | 32R | seal |
| 34 | counterbalance | 34-1 | counterbalance |
| 34A | threaded hole | 34B | threaded hole |
| 34C | threaded hole | 36 | leadweight |
| 36A | leadweight retainer | 38 | bearing housing |
| 40 | bearing ridge | 42 | washer |
| 42A | hole | 44 | wire wheel cap |
| 46 | hole | 48 | threading |
| 50 | taper | 52 | wire wheel cap face |
| 54 | snap ring | 54A | hole |
| 54B | hole | 56 | drilled bolt |
| 56A | holes | 56B | bolt head |
| 56C | shaft | 56D | threading |
| 58 | crown nut | 58A | threaded section |
| 58B | teeth | 60 | cotter pin |
| 62 | bolt | 62A | threaded section |
| 62B | shaft | 62C | bolt head |
| 64 | nut | 64A | threaded section |
| 66 | center cap | 66A | counterbored hole |

DETAILED DESCRIPTION—FIGS. 1 to 8-1

FIG. 1 shows a left-side view of a ornamental image of the invention. The front portion of the ornamental image, dressing, enhancer 24 consists of chrome or gold plated plastic material by electroforming. In the preferred embodiment, ornament 24 is composite plastic however, it can consist of any other material durable enough for the process of tank plating or electroform plating, such as polypropylene, polysulfone, polyethylene HD, polycarbonate, CPVC, Azdel, Acetyl Homopolymer, Extrusion Grade ABS, HIGH IMPACT ABS, high-density resin, aluminum, brass, bronze, potmetal, pewter, hardened stainless steel, nickel-base alloys, and cobalt-base alloys. Ornament 24 is constructed by sand casting, or injection casting method. Molds for forming the feature or image of ornament 24 can be hand made from clay or constructed using a computer numerical controlling (CNC) machine, but I prefer to combine the three methods by initially constructing the image from a hand made artist composed mold. Next, transferring the hand made mold to a computer-aided draft using a three dimensional scanner. Finally, programming the scanned dimensions into the (CNC) machine to create an asymmetrical injection mold, in turn, comprising ornament 24 of an art piece exhibiting the lively appearance of natural expression.

The outer dimensions of ornament 24 is typically 1 and $\frac{1}{2}$" to 2 and $\frac{1}{2}$" in thickness, and has overall dimensions roughly from 4"×4.5" to 5"×5.5". FIG. 1-1 shows a rear-view of ornament 24 containing a counterbalance housing 26. The peripheral surface of housing 26 consists of a decagon configuration. The central cavity of housing 26 comprises a circular shape containing a semi-circular counterbalance rest 28 simultaneously constructed with ornament 24. The central cavity of counterbalance housing 26 is approximately 3" in diameter and 1" in thickness. Counterbalance rest 28 is approximately 3 and $\frac{3}{8}$" in diameter and $\frac{1}{8}$" in thickness. The outer portion of counterbalance housing 26 contains a plurality of counterbored holes 24A 24B 24C. Counterbored holes 24A 24B 24C range from $\frac{1}{8}$" to $\frac{1}{4}$" in diameter being $\frac{1}{16}$" to $\frac{1}{8}$" deep.

Figure 4:
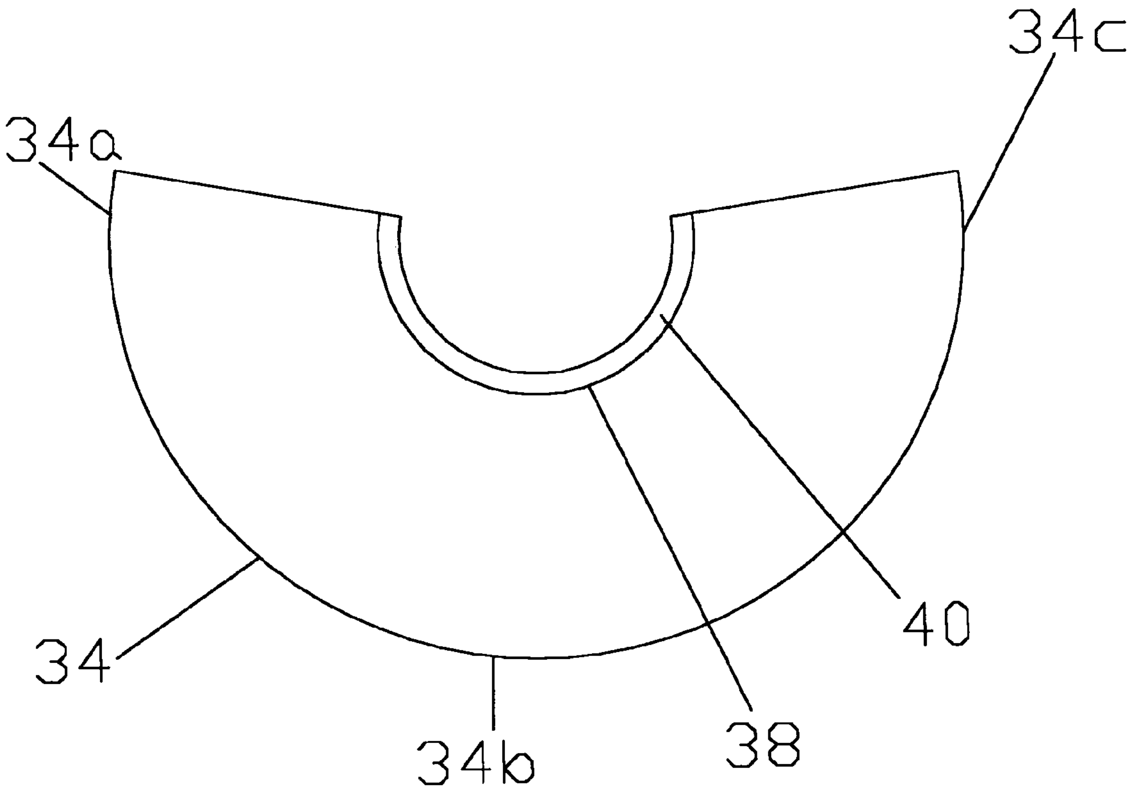
FIG. 4 shows a front view of a counterbalance.
Figures 1, 4:
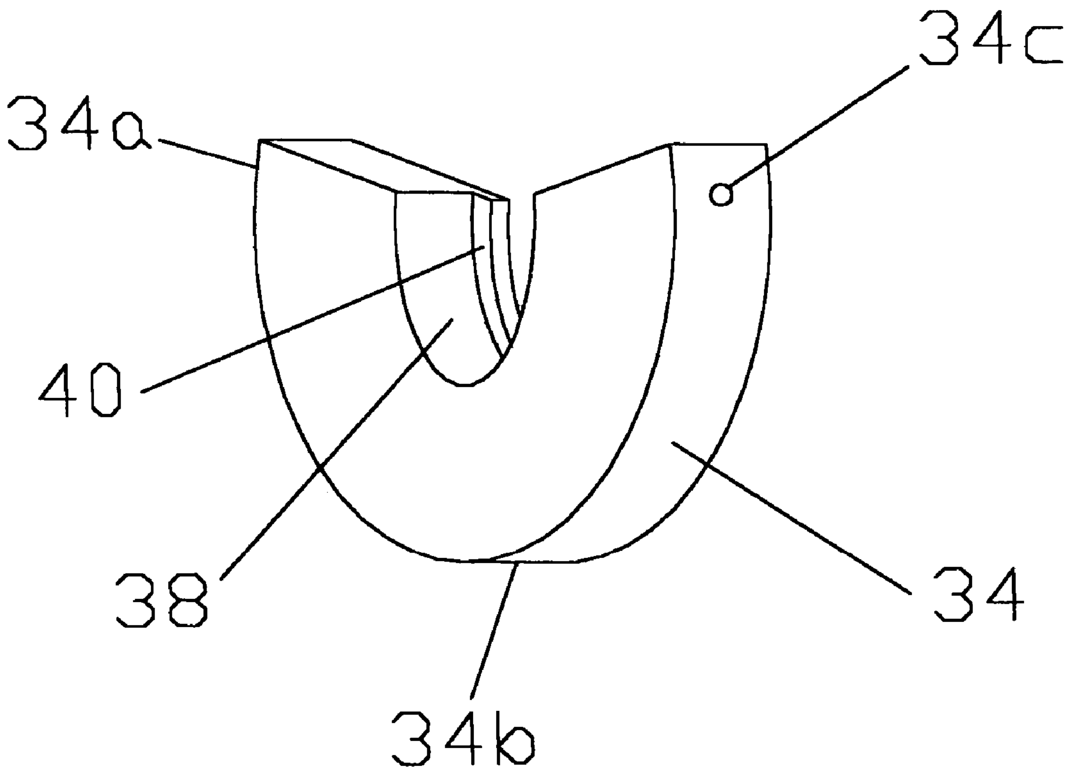
Figure 5:
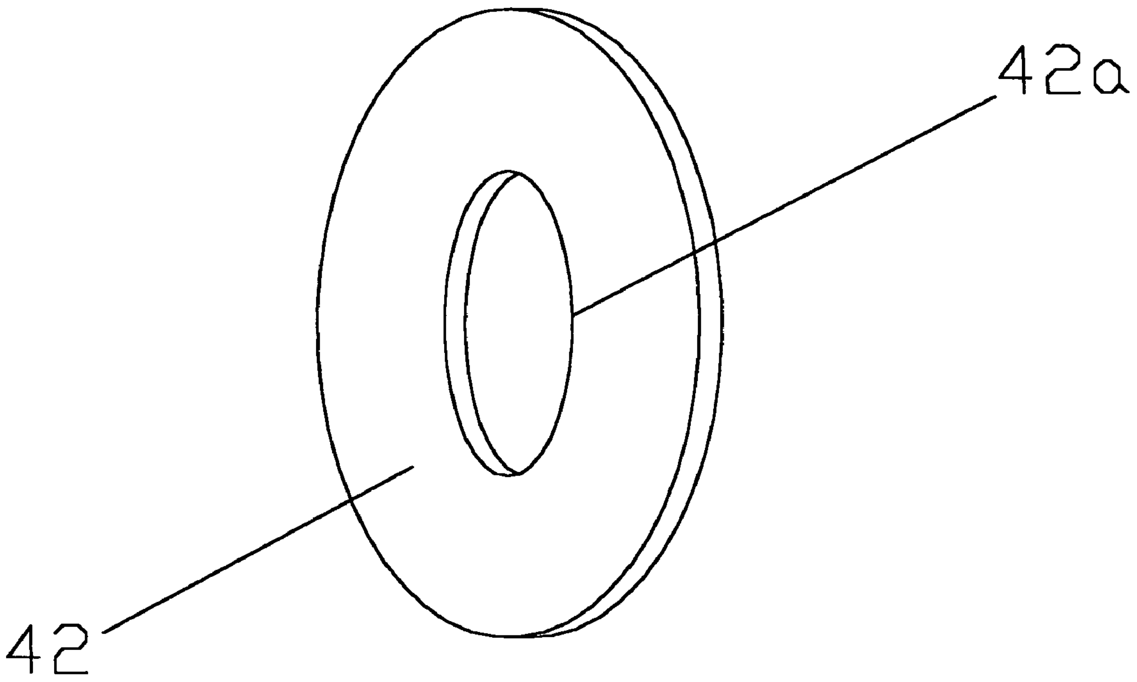
FIG. 5 shows a isometric view of a washer.

Counterbalance housing 26 and counterbalance rest 28 is joined to a counterbalance 34 (FIGS. 4 and 4-1). In the preferred embodiment, counterbalance 34 comprises a horseshoe configuration and is machined from billet steel however, counterbalance 34 can be fabricated from various types of other heavy metals, such as bronze, brass, or cast-iron. Counterbalance 34 is approximately 3 and $\frac{11}{32}$" in diameter and $\frac{5}{8}$" to $\frac{7}{8}$" in thickness and has overall dimensions roughly from 3 and $\frac{11}{32}$"×2" to 5"×2.5". Counterbalance 34 contains a plurality of threaded holes 34A 34B 34C evenly spaced along the outermost wall. Threaded holes 34A 34B 34C are approximately $\frac{8}{64}$" in diameter and typically $\frac{3}{8}$" in depth containing a tap size of 4-40 (Ten threads/inch). Threaded holes 34A 34B 34C joins a number of screws (25A 25B 25C). Screws 25A 25B 25C contain threading about the distal portion, which may be fine or coarse. The uppermost portion of screws 25A 25B 25C comprises circular shaped form, which may be countersunk or shanked. The base of screws 25A 25B 25C ranged from $\frac{1}{8}$"-$\frac{5}{16}$" in thickness and approximately $\frac{1}{2}$"-$\frac{3}{4}$" in length.

Figure 3:
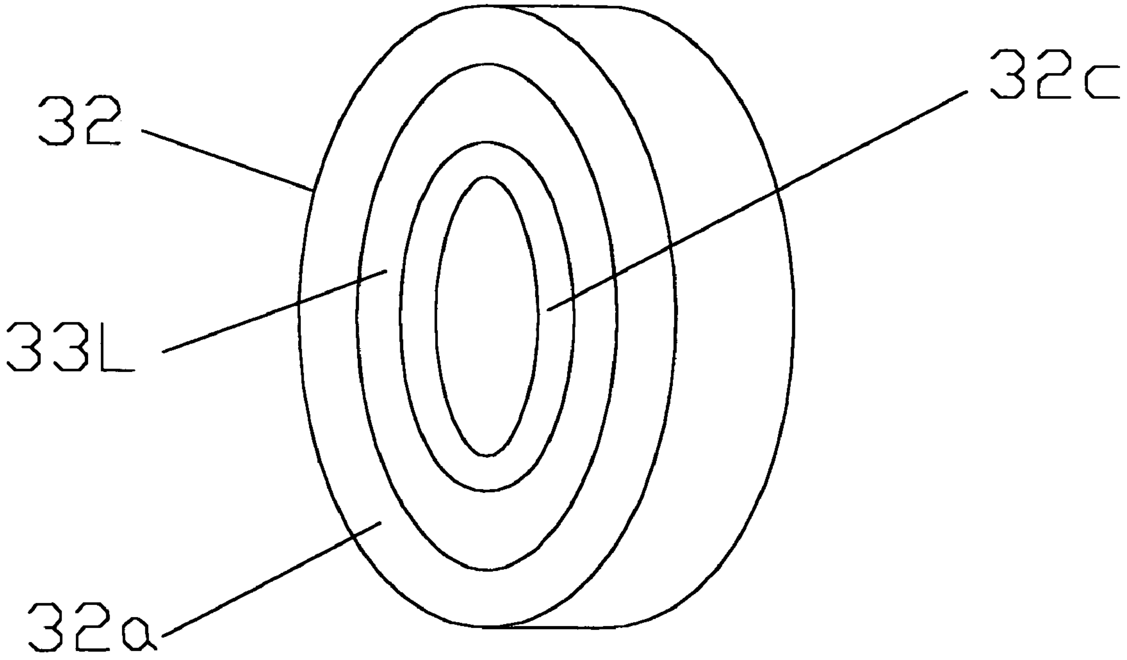
FIG. 3 shows a isometric view a bearing assembly.
Figures 1, 3:
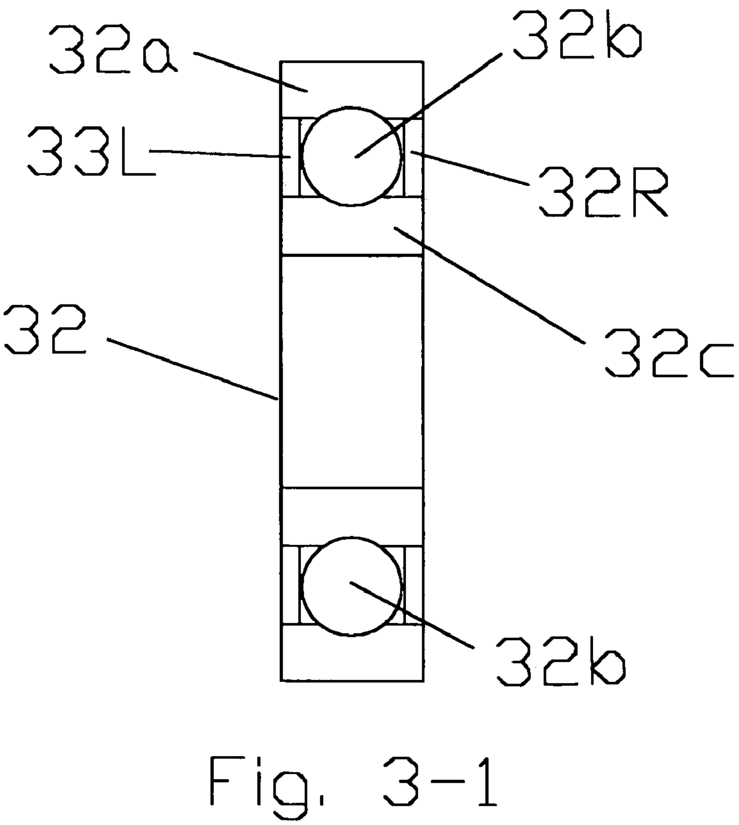

The centermost portion of counterbalance 34 contains a bearing ridge 40 (FIGS. 4 and 4-1) formed by machining. Bearing ridge 40 ranges from 1 and $\frac{7}{16}$" to 2.5" in diameter and $\frac{1}{16}$" in thickness. Bearing ridge 40 is adjacent to a bearing housing 38 formed by machining. Bearing housing 38 ranges from 1 and $\frac{7}{16}$" to 2.5" in diameter and has a thickness of $\frac{5}{8}$". Bearing housing 38 joins a bearing assembly 32 (FIGS. 3 and 3-1). In the preferred embodiment bearing assembly 32 is sealed, however the bearing assembly can consist of other types of bearing assemblies, such as sealed or unsealed roller bearings or unsealed ball bearings. Bearing assembly 32 contains a plurality of enclosures (32A) and 32C comprised of machined steel encompassing a number of steel ball bearings 32B (FIG. 3-1). A circular rubber seal 32L and 32R accommodates the central opening between enclosures 32A and 32C by compression, forming the sides of bearing assembly 32. The diameter of large enclosure 32A of bearing assembly 32 range from 1 and $\frac{27}{64}$" to 3" and ranges from $\frac{1}{2}$" to 2" in thickness. The diameter of small enclosure 32C of bearing assembly 32 range from $\frac{1}{2}$" to 1.5" and ranges from $\frac{1}{2}$" to 2" in thickness.

Figure 2:
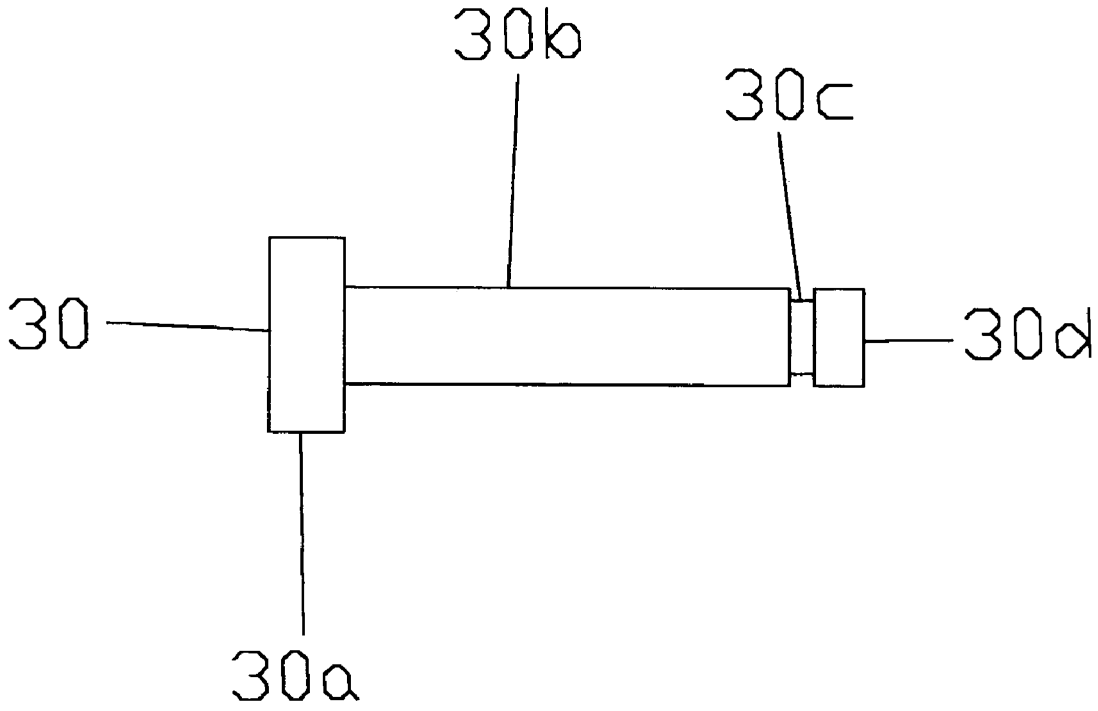
FIG. 2 shows a side view of a spindle
Figure 7:
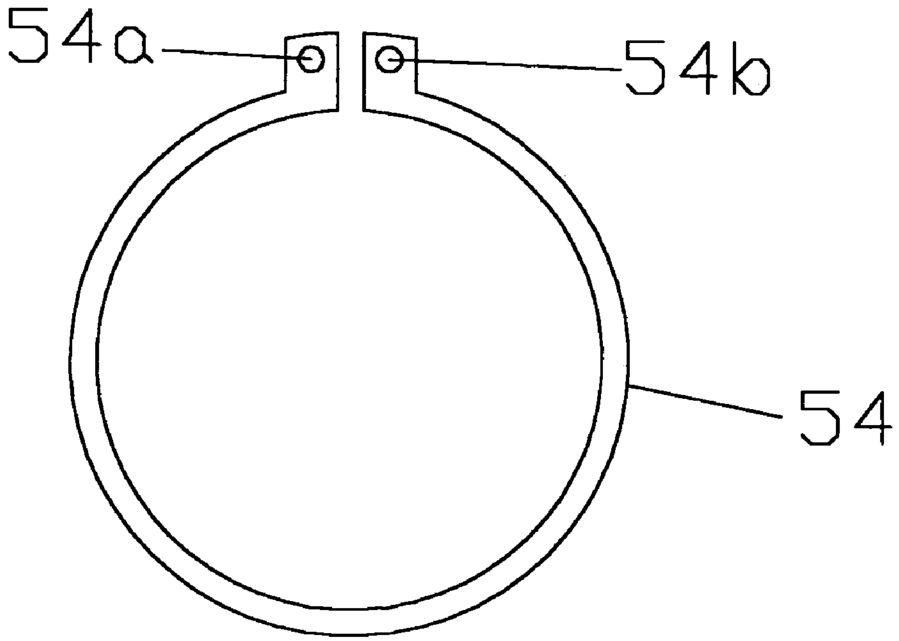
Figures 1, 7:
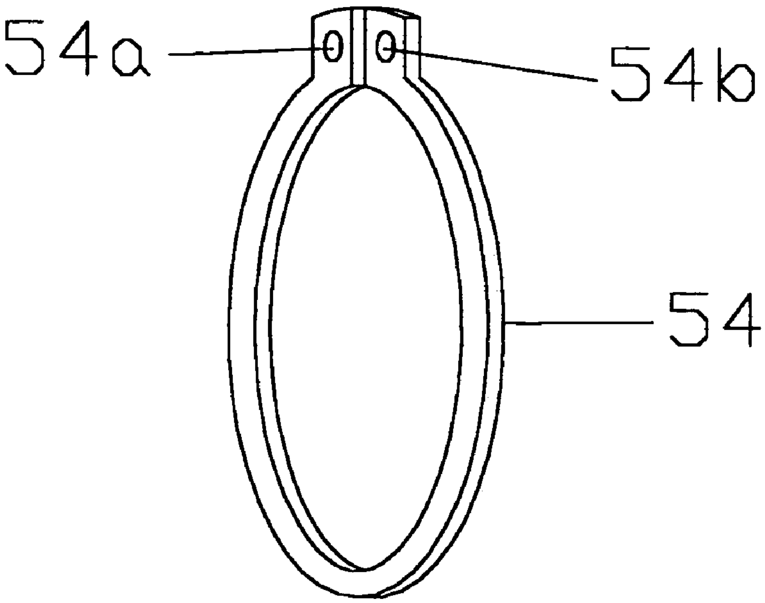

Small enclosure 32C of bearing assembly 32 joins a cylindrical spindle 30 FIG. 2. In the preferred embodiment, spindle 30 formed by machining is constructed using machine steel however, it can be constructed using other types of high strength metals such as hardened stainless steel, nickel-base alloys, cobalt-base alloys or high grade iron. The distal end of spindle 30 contains a circular head 30A. Spindle head 30A joins a cylindrical shaft 30B comprising a circular snap-ring groove 30C formed between an adjoining spindle end 30D. Snap-ring groove 30C joins a circular shaped snap ring 54 (FIGS. 7 and 7-1) containing a separation within the upper portion. Cylindrical shaft 30B joins a metallic circular washer 42 (FIG. 5) following a metallic snap-ring 54 containing a plurality of holes 54A and 54B in the upper proximity of the seperated portion (FIGS. 7 and 7-1).

Spindle head 30A of spindle 30 (FIG. 2) ranges from $\frac{1}{2}$"-$\frac{5}{8}$" in diameter being approximately $\frac{1}{8}$"-$\frac{1}{4}$ in thickness. Spindle shaft 30B ranges from $\frac{3}{4}$" to 1" in length and has a diameter of approximately $\frac{1}{2}$"-$\frac{5}{8}$". Snap-ring groove 30C contains a diameter of $\frac{3}{8}$" and having a width of $\frac{1}{16}$"-$\frac{1}{8}$". Spindle end 30D contains a diameter ranging from $\frac{3}{4}$"-1" and is $\frac{1}{16}$"-$\frac{1}{8}$" in thickness. Washer 42 (FIG. 5) contains a inside diameter of ½" and a outside diameter of ⅝" and having a thickness of ⅛". Snap-ring 54 (FIGS. 7 and 7-1) contains a diameter approximately ⅝"-⅞" and having a thickness of ⅛". Holes 54A and 54B typically range from 1/16" to ⅛" in diameter.

Figure 6:
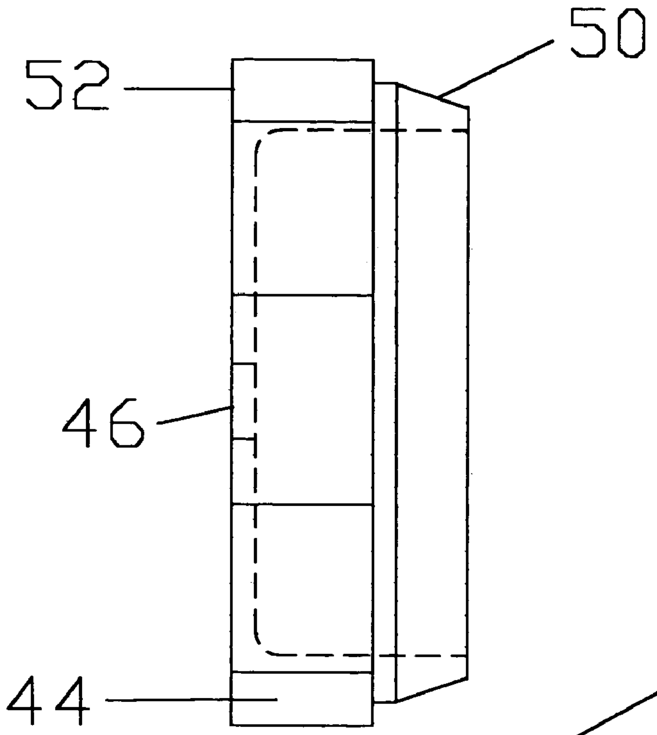
FIG. 6 shows a side view with hidden lines of a wire wheel cap.
Figures 1, 6:
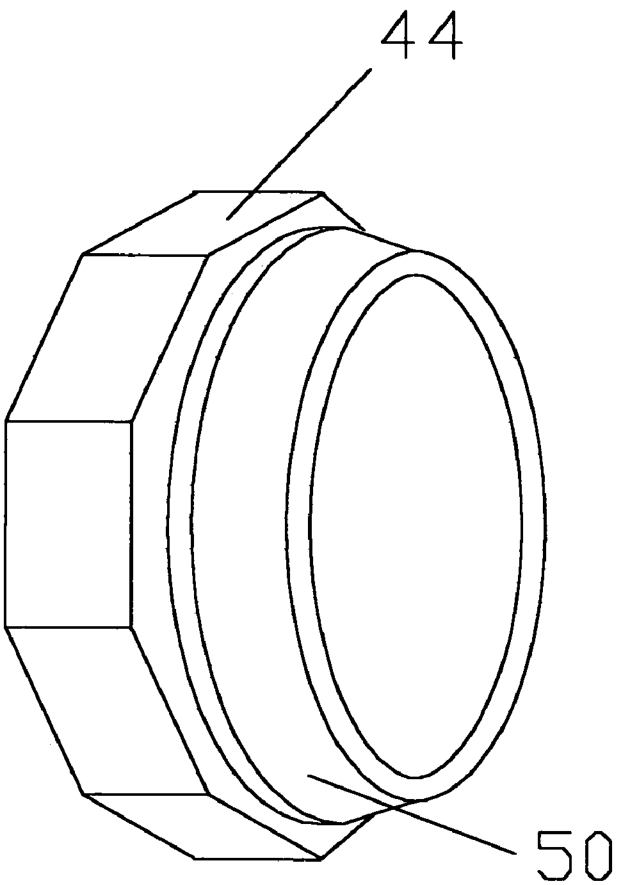
Figures 2, 6:
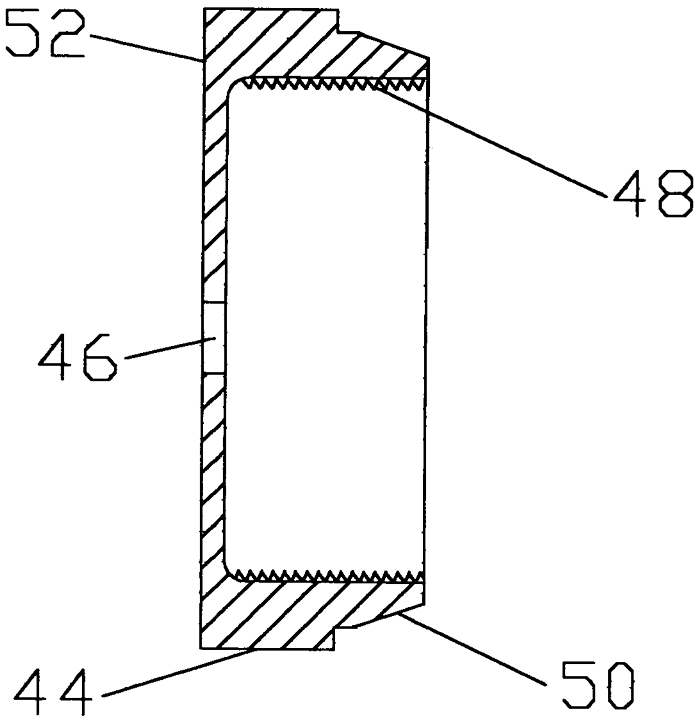
Figures 3, 6:
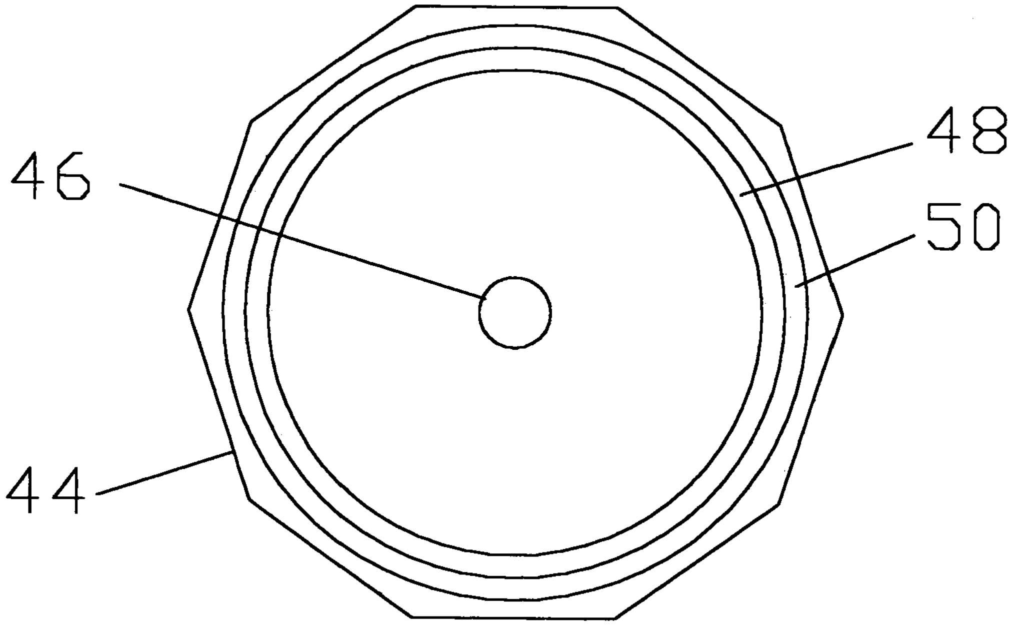

Spindle shaft 30B joins a central opening of a wheel cap 44 (FIGS. 6 to 6-3). In the preferred embodiment, wheel cap 44 is constructed using bronze however, it can be fabricated using other types of metallic materials such as brass, steel, cast iron, or stainless steel. The central section of wheel cap 44 contains a round hole 46 FIG. 6-3. Hole 46 is located within a wheel cap face 52 consisting of a solid wall of metallic material. The posterior opening of wheel cap 44 contains a plurality of fine threading 48 (FIG. 6-2) machined within the inner circumference. The outer circumference of wheel cap 44 contains a plurality of flat surfaces forming a decagon configuration FIGS. 6-1 and 6-3. The decagon configuration joins a circular tapered section 50 constructed along the distal portion of wheel cap 44 (FIGS. 6 and 6-2).

The round hole 46 of wheel cap 44 ranges from ½" to ⅝" in diameter. The wheel cap face comprises a thickness of ¼". The posterior opening of wheel cap 44 is approximately 2 and ⅞" in diameter and 1 and ½" in depth. Threading 48 consists of class 2b unified screw threads formed along the inner wall with eight threads per ¾" extending 1 and 7/32" deep. Taper 50 is approximately ½" in thickness having an angle of 15 degrees.

Operation—FIGS. 1 to 8-1

Figure 8:
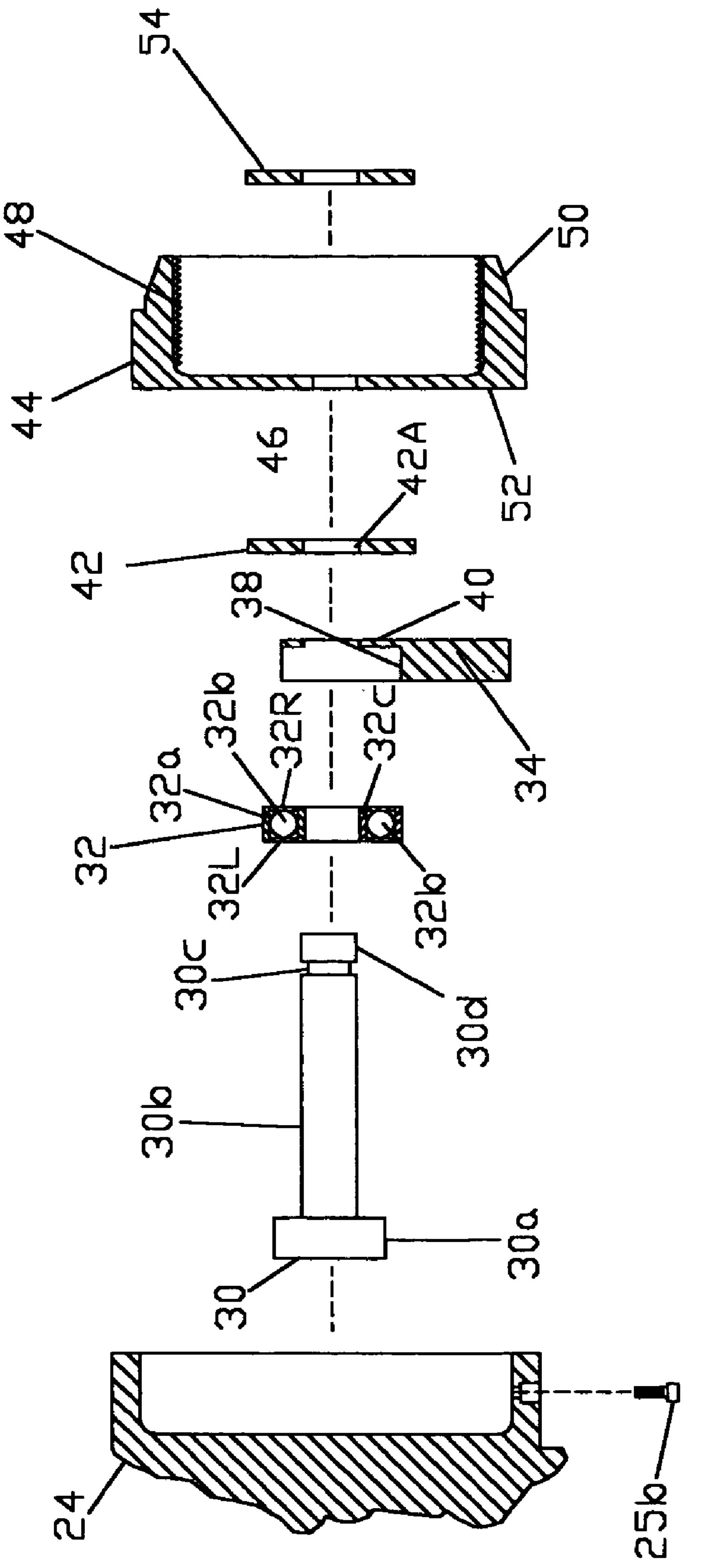
FIG. 8 shows a cross sectional exploded view of the ornament and wire wheel cap.
Figures 1, 8:
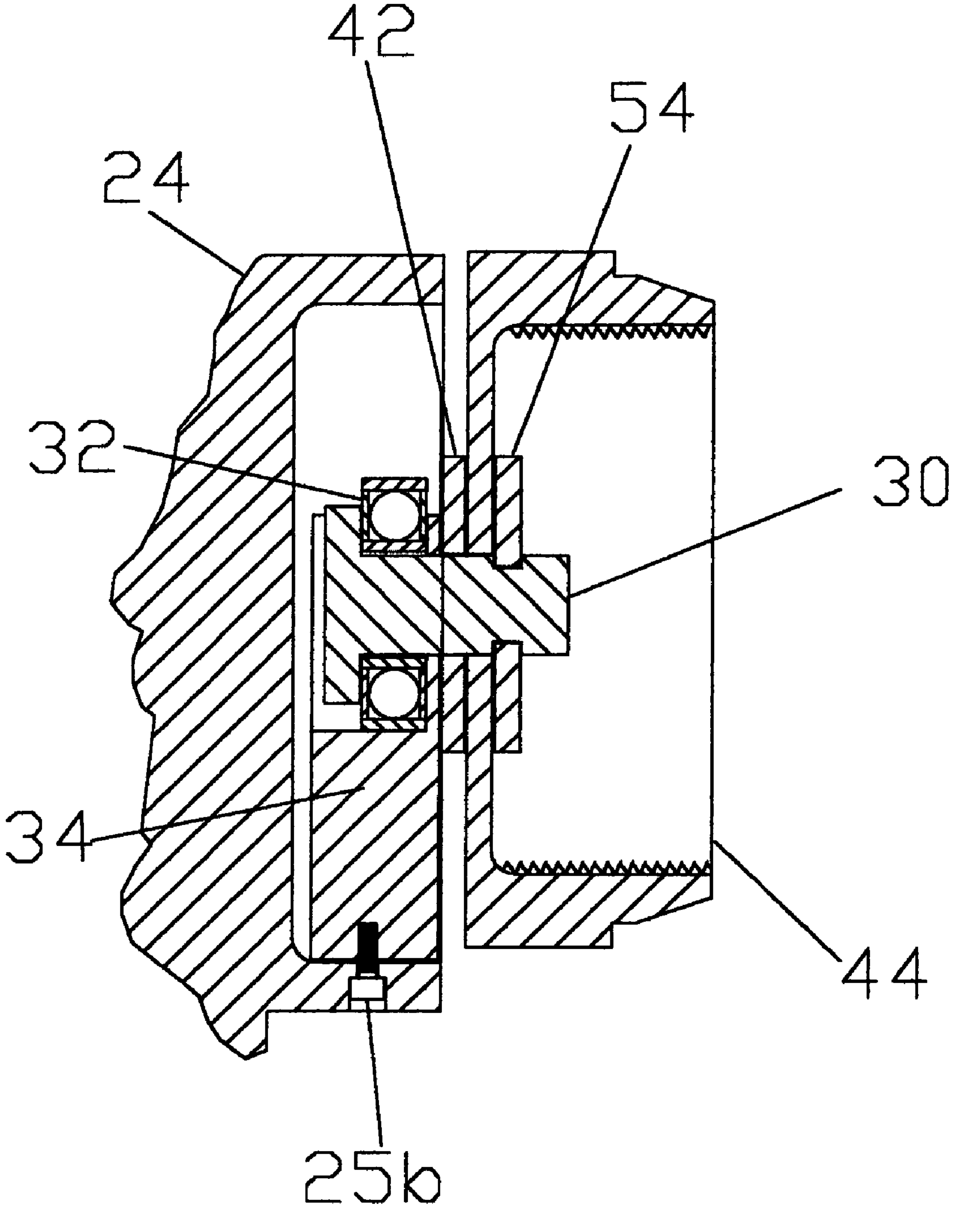

In operation ornament 24 is constructed for additional wheel enhancement of present automoiles, semi-trailers, boat carrying trailers and golf cars by illustrating personage or beastlike features, logos, trademarks, etc, while being non-rotatable upon wheel rotation for continuous observability as shown in FIG. 19. Housing 26 contains a plurality of counterbored holes 24A 24B 24C along the outer circumference for occupying screws 25A 25B 25C (FIG. 1-1). The central portion of housing 26 allows installation of a counterbalance 34 (FIGS. 4 and 4-1).The horse-shoe configuration of counterbalance 34 is designed to accomodate the centermost region of a wheel permitting maximum stability. Counterbalance housing 26 (FIG. 1-1) includes a counterbalance rest 28 for stopping and stabilizing counterbalance 34. Counterbalance 34 includes a plurality of threaded holes 34A 34B 34C (FIG. 4-1) for receiving screws 25A 25B 25C adjoining counterbalance housing 26 to counterbalance 34. The center portion of counterbalance 34 contains a bearing ridge 40 (FIG. 4-1). Bearing ridge 40 functions as a retainer and allows one-way entry for a bearing assembly. A bearing housing 38 is adjacent to bearing ridge 40 (FIG. 4-1). Bearing housing 38 is structured for placing and retaining a bearing assembly 32 (FIGS. 3 and 3-1) by compression fitting. FIG. 3-1 shows bearing assembly 32 comprising a rubber seal 32L and 32R for preventing the entrance of dirt and moisture within bearing assembly 32 and a plurality of ball bearings 32B confined between a large and small enclosure 32A and 32C permitting independant rotational motion of a spindle 30 (FIG. 2). FIGS. 2, 8, and 8-1 shows spindle 30 comprising a spindle head 30A. Spindle head 30A is constructed to adjoin the small enclosure 32C of bearing assembly 32 (FIG. 8). A spindle shaft 30B extending from spindle head 30A provides axial support of bearing assembly 32. Shaft 30B contains a snap-ring groove 30C for establishing a snap-ring 54. Snap-ring 54 retains entire bearing assembly 32 upon shaft 30B (FIG. 8-1). A spindle end 30D results in forming snap-ring groove 30C. Spindle end 30D assists in retaining snap ring 54 within groove 30C.

Figure 16:
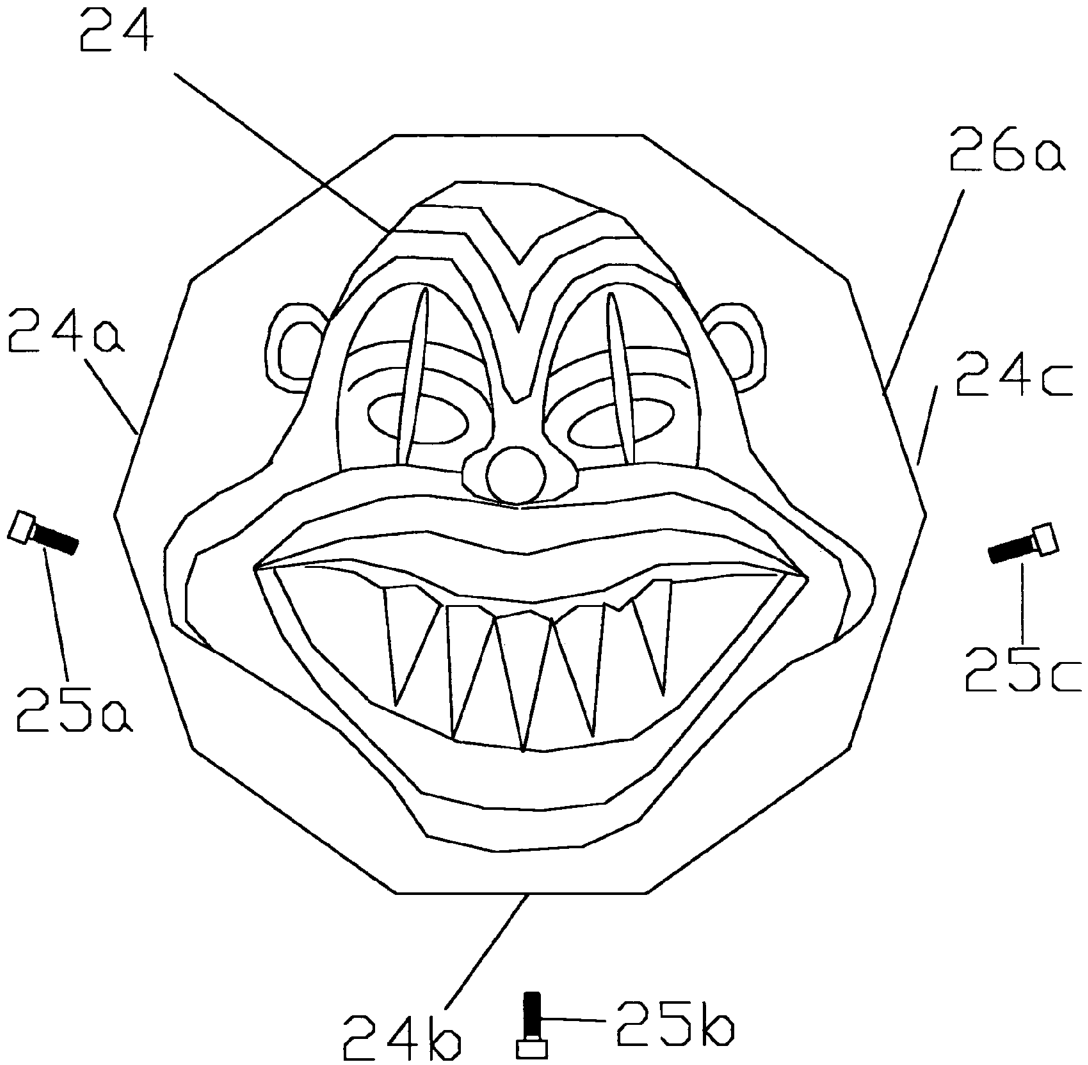
Figures 1, 16:
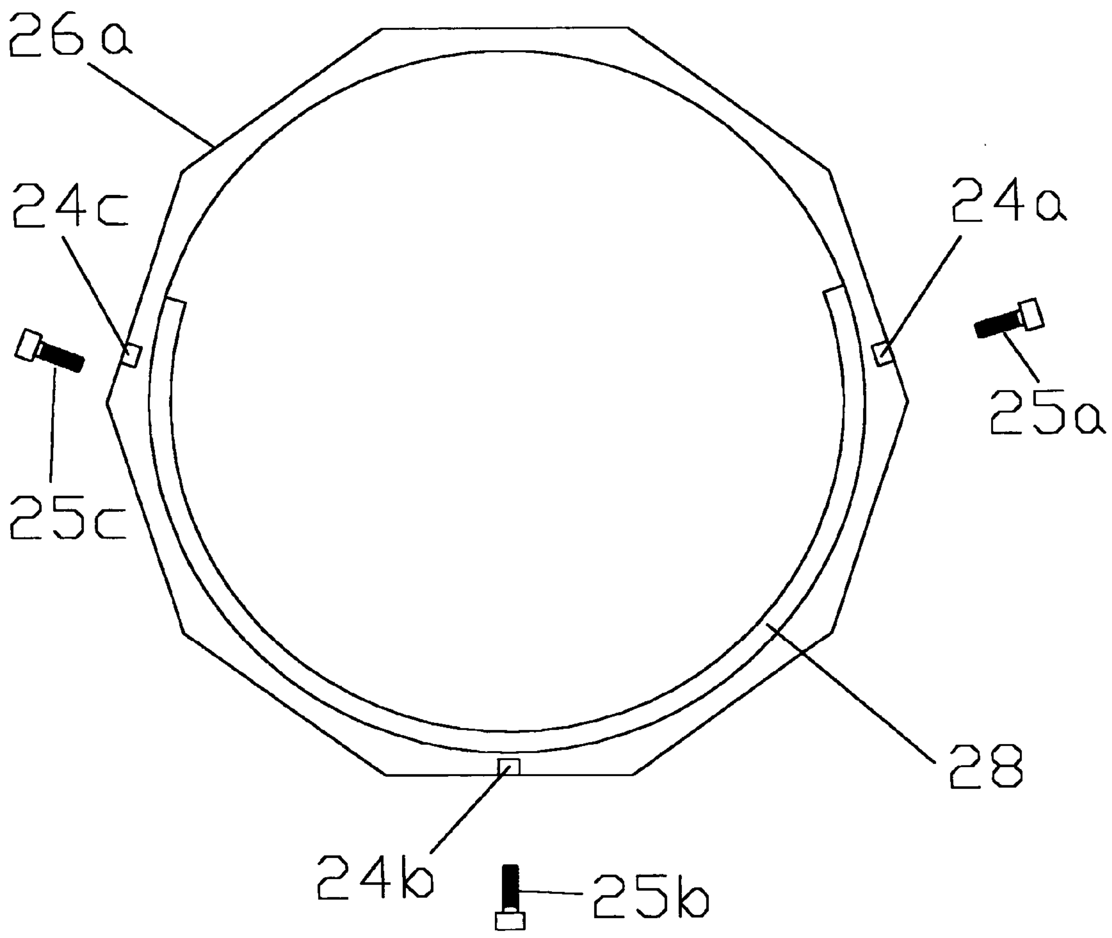
Figures 2, 16:
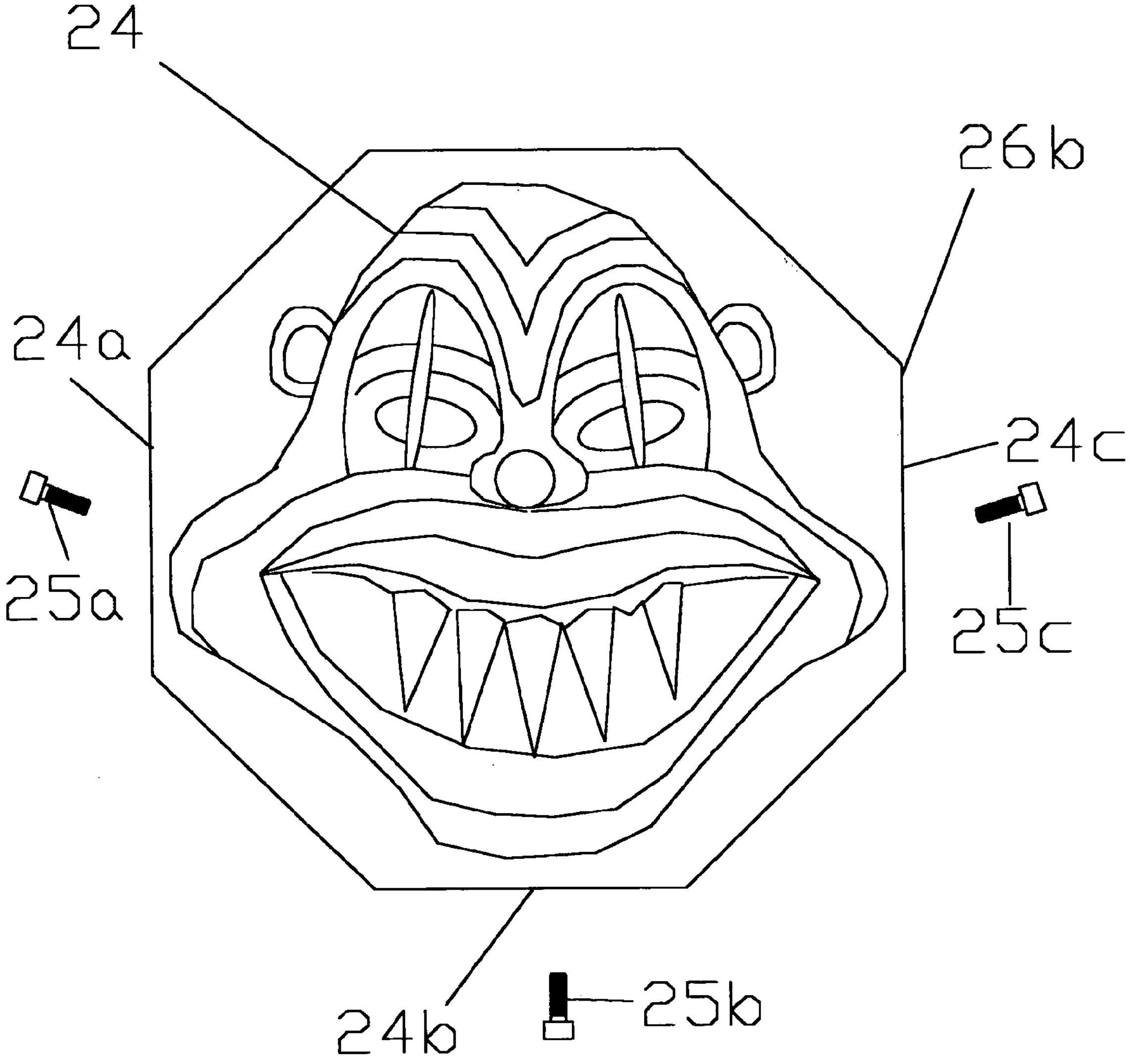
Figures 3, 16:
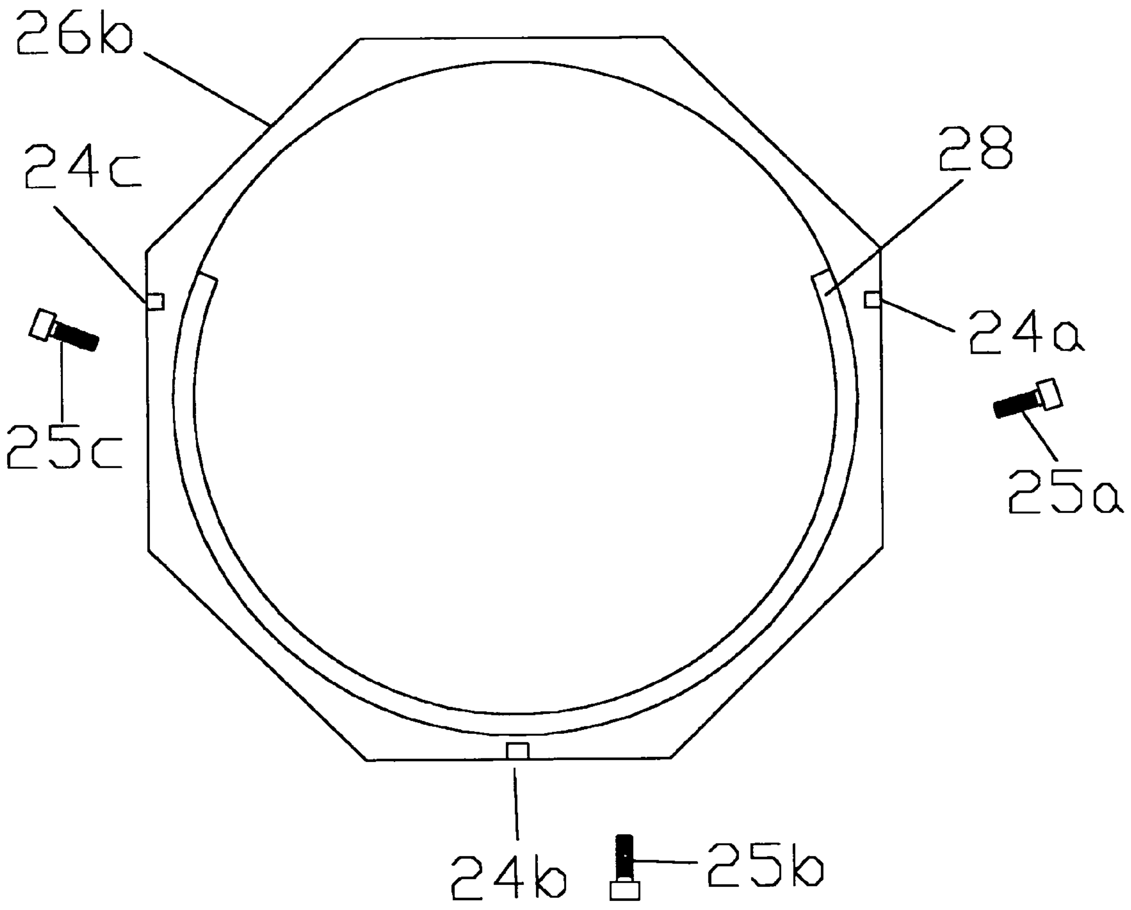
Figures 4, 16:
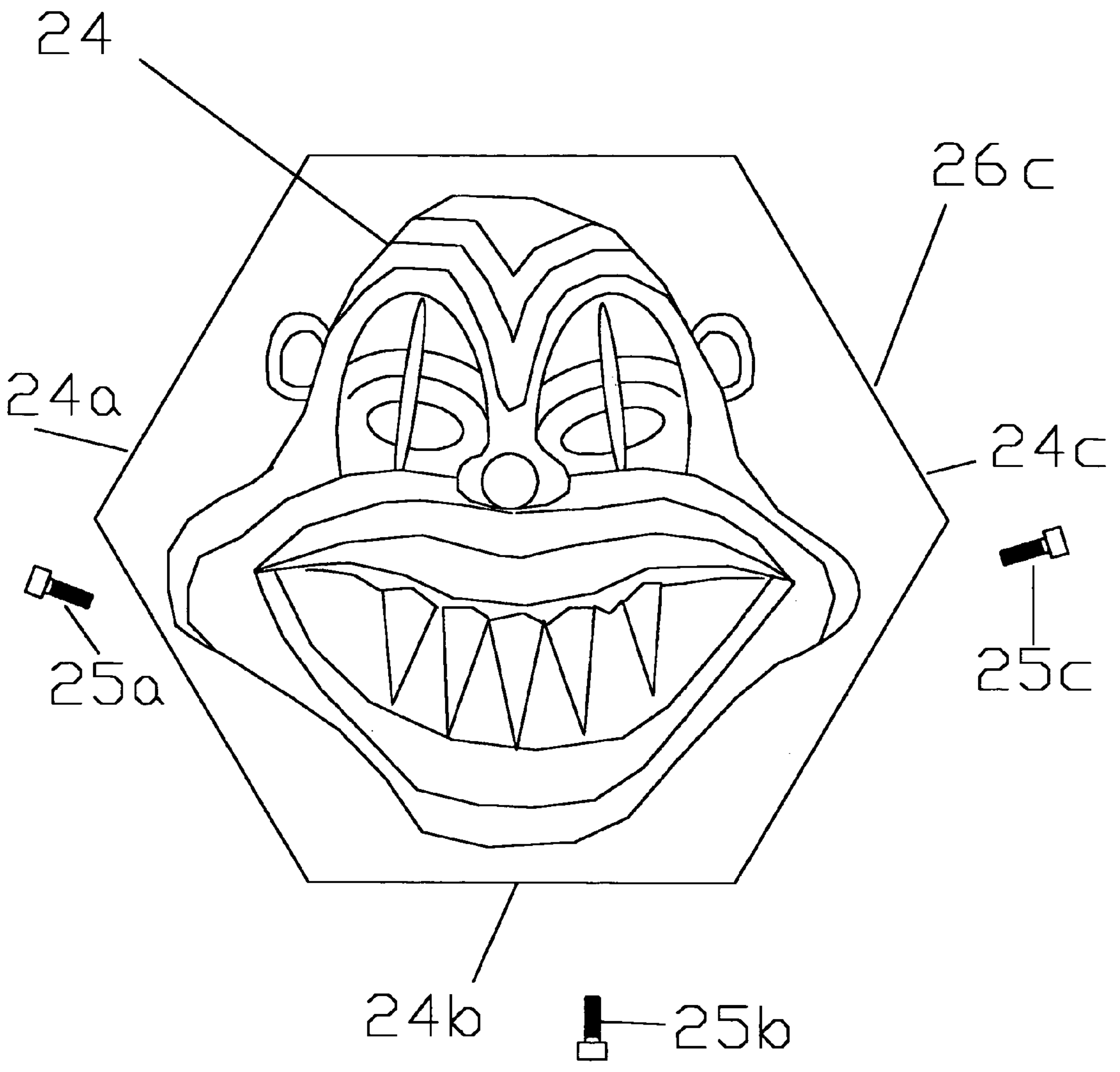
Figures 5, 16:
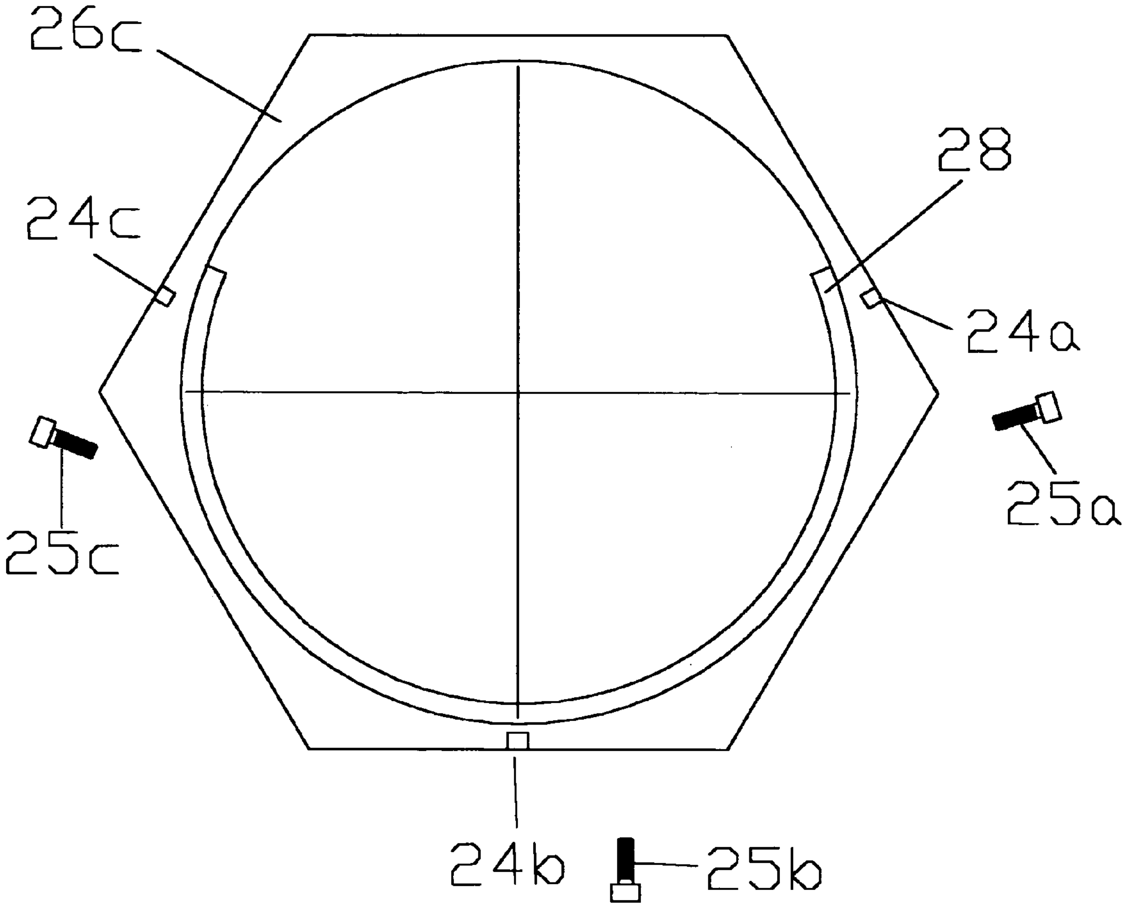
Figures 6, 16:
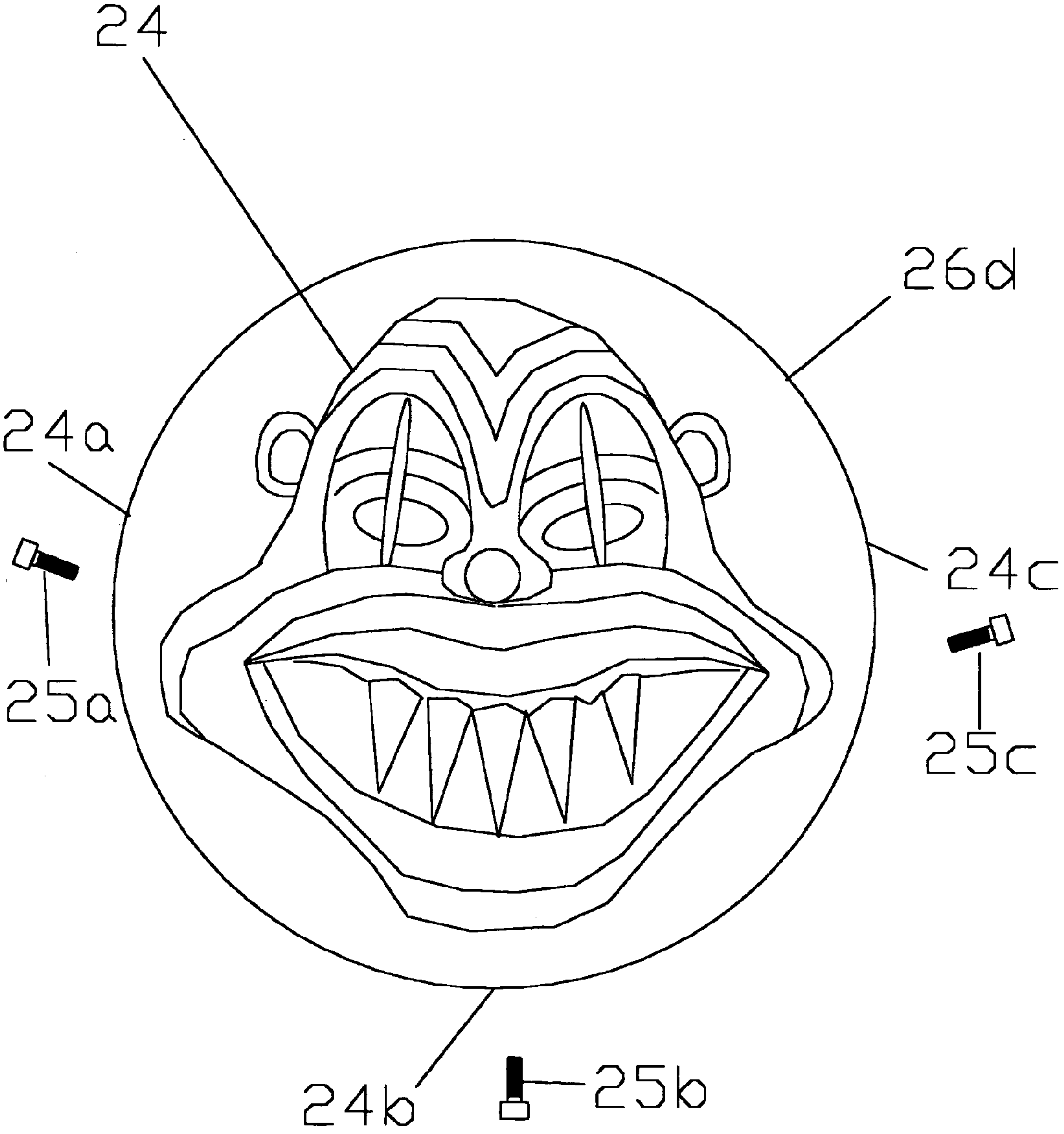
Figures 7, 16:
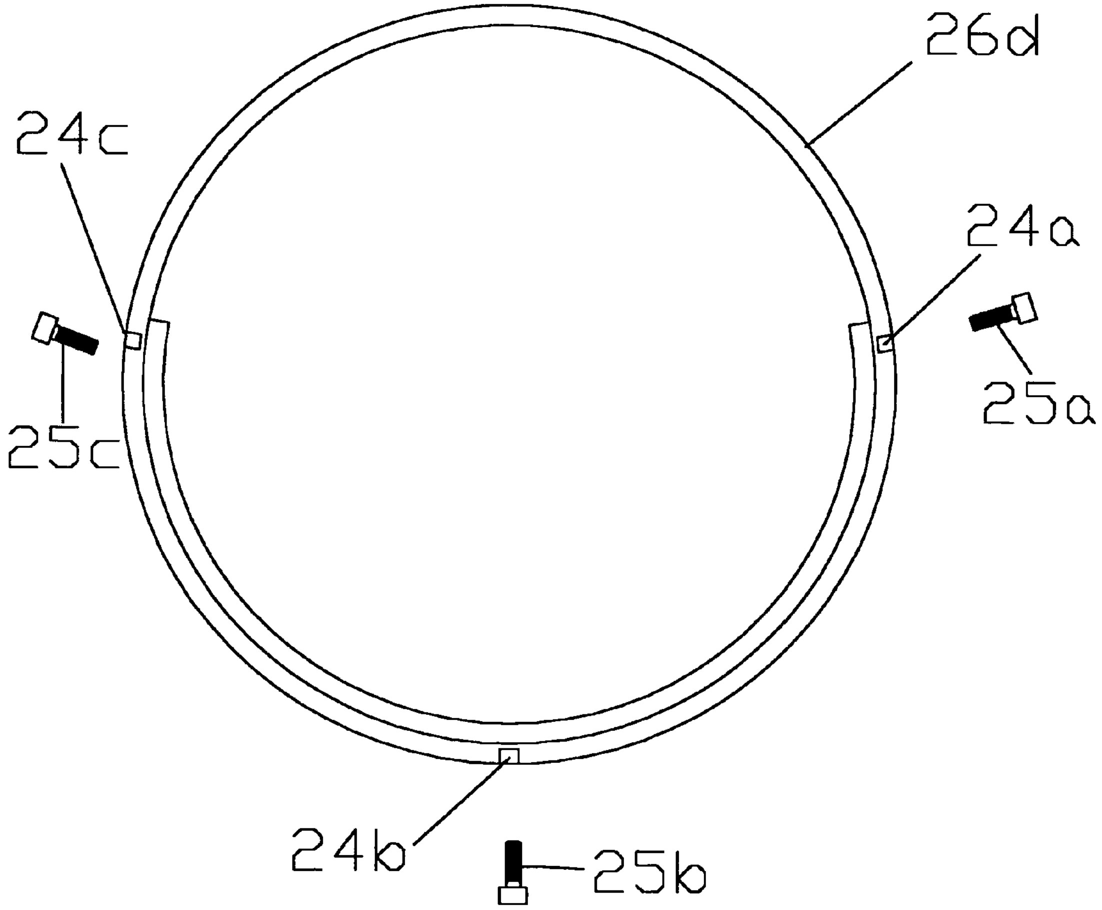

FIGS. 16 to 16-7—Additional Embodiments

Additional embodiments are shown in FIGS. 16 to 16-7; in each case the ornament 24 is shown attached. In FIGS. 16 and 16-1 the counterbalance housing has only ten sides with counterbored holes 24A 24B 24C; in FIGS. 16-2 and 16-3 it has only eight sides with counterbored holes 24A 24B 24C; in FIGS. 164 and 16-5 it has only six sides with counterbored holes 24A 24B 24C; and FIGS. 16-6 and 16-7 it is circular with counterbored holes 24A 24B 24C, all being formed simultaneously with ornament 24. Counterbored holes 24A 24B 24C join screws 25A 25B 25C to couple counterbalance housing 26 with counterbalance 34.

The operation of each of the embodiments of the present invention is next described. In operation, housings 26A (FIG. 16-1) 26B (FIG. 16-3) 26C (FIG. 16-5) contain a peripheral surface consisting of a decagon configuration. The central cavity of housings 26A 26B 26C 26D comprises a circular shape containing a semi-circular counterbalance rest 28. Rest 28 is simultaneously constructed with ornament 24. The central cavity of counterbalance housings 26A 26B 26C 26D are approximately 3" in diameter and 1" in thickness. Counterbalance rest 28 is approximately 3 and ⅜" in diameter and ⅛" in thickness. Counterbored holes 24A 24B 24C occupy screws 25A 25B 25C. Counterbored holes 24A 24B 24C range from ¼" to ⅜" in diameter being ⅛" to ¼" deep. Screws 25A 25B 25C contains threading about the distal portion which may be fine or coarse. The uppermost portion of screws 25A 25B 25C comprises a circular shaped, which may be countersunk or shanked. The base of screws 25A 25B 25C range from ⅛" to 5/16" in thickness and approximately ½" to ¾" in length.

Figure 14:
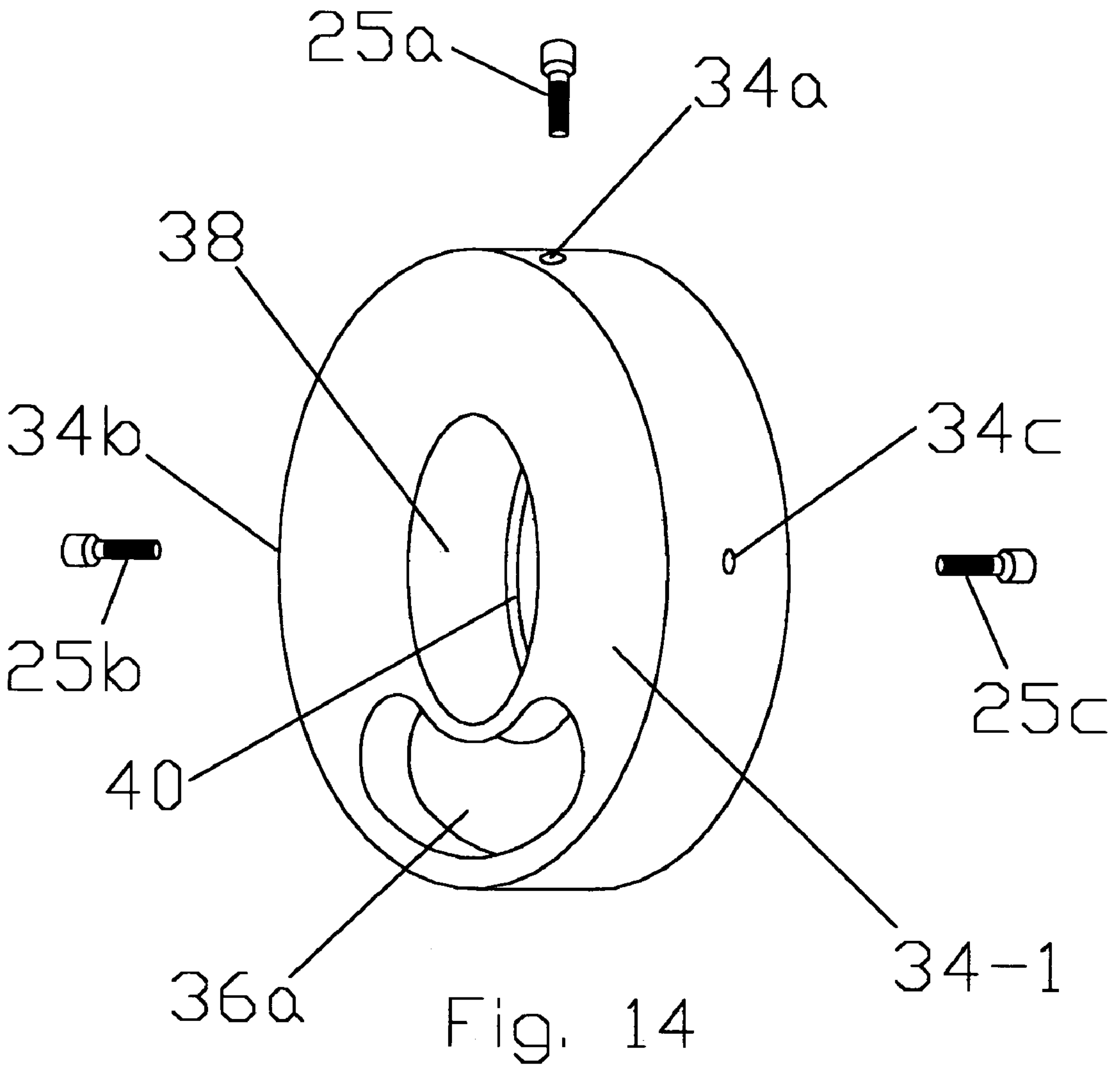
FIG. 14 shows a isometric view of a circular counterbalance with a retainer formed in the base.

The central portion of housing 26A (FIG. 16-1) 26B (FIG. 16-3) 26C (FIG. 16-5) and 26D (FIG. 16-7) allows installation of counterbalance 34 (FIGS. 4 and 4-1) and counterbalance 34-1 (FIG. 14).

Alternative Embodiments—FIGS. 10 to 10-2

Figure 15:
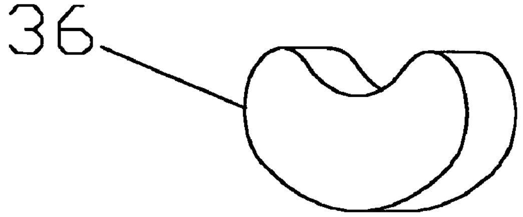
FIG. 15 shows a isometric view of a leadweight insert.

There are other possibilities with regard to the relative configuration of counterbalance 34. With respect to FIGS. 14 and 15 counterbalance 34-1 is constructed as an entire circular piece containing threaded holes 34A 34B 34C. The central portion of counterbalance 34-1 utilizes bearing ridge 40 and bearing housing 38 and a leadweight retainer 36A. Retainer 36A joins a leadweight 36 comprised of lead however, leadweight 36 may consist of any other dense metal material for stabilization such as brass or bronze.

The operation of each of the alternative embodiments of the present invention is next described. In operation, counterbalance 34-1 consists of an entire piece of metallic material (FIG. 14) for fully occupying counterbalance housings 26 26A 26B 26C and 26D. Counterbalance 34-1 is machined from billet steel however, counterbalance 34-1 can be fabricated from various types of other heavy metals, such as bronze, brass, or cast-iron. Counterbalance 34-1 is approximately 3 and 11/32" in diameter and ⅝"-⅞" in thickness. Counterbalance 34-1 contains a plurality of threaded holes 34A 34B 34C evenly spaced about the outermost wall. Threaded holes 34A 34B 34C are approximately ⅛" in diameter and typically ⅜" in depth containing a tap size of 4-40 (Ten threads/inch).

Threaded holes 34A 34B 34C joins a number of screws (25A 25B 25C). Screws 25A 25B 25C contain threading about the distal portion which may be fine or coarse. The uppermost portion of screws 25A 25B 25C comprises a circular shaped, which may be countersunk or shanked. The base of screws 25A 25B 25C ranged from $\frac{1}{8}$"-$\frac{5}{16}$" in thickness and approximately $\frac{1}{2}$"-$\frac{3}{4}$" in length. Leadweight retainer 36A (FIG. 14) is $\frac{1}{2}$" in width and 2 and $\frac{3}{8}$" in length and $\frac{1}{2}$" in thickness. Leadweight 36 (FIG. 15) is $\frac{1}{2}$" in width and 2 and $\frac{11}{32}$" in length and $\frac{1}{2}$" in thickness.

With respects to FIGS. 9 to 9-1 and 10 to 10-1 there are other possibilities with regard to the relative configuration of spindle 30. FIGS. 9 and 9-1 shows a standard bolt 62 having a threaded section 62A adjoining a shaft 62B and a hexagon type head 62C. Threaded section 62A joins a standard nut 64 having a threaded section 64A. The standard bolt 62 is roughly 3" in length having a diameter of $\frac{1}{2}$". Threaded section 62A is approximately 1 and $\frac{1}{2}$" in length and having a diameter of $\frac{1}{2}$". Shaft 62B is roughly $\frac{5}{8}$" in length with a diameter of $\frac{1}{2}$". Bolt head 62C is approximately $\frac{1}{4}$" in thickness having a diameter of $\frac{1}{2}$". Nut 64 is roughly $\frac{1}{2}$" in thickness with a diameter of $\frac{1}{2}$".

With respects to (FIGS. 17-1 and 17-2) bolt shaft 62B is constructed to occupy small enclosure 32C of bearing assembly 32 and central holes 42A and 46 of washer 42 and wheel cap 44. Bolt shaft 62B extends from head 62C to provide axial support of bearing assembly 32. Threaded section 62A of bolt 62 connects with threaded section 64A of nut 64 to secure bearing assembly 32 and counterbalance 34 to wire wheel cap 44.

Figure 11:
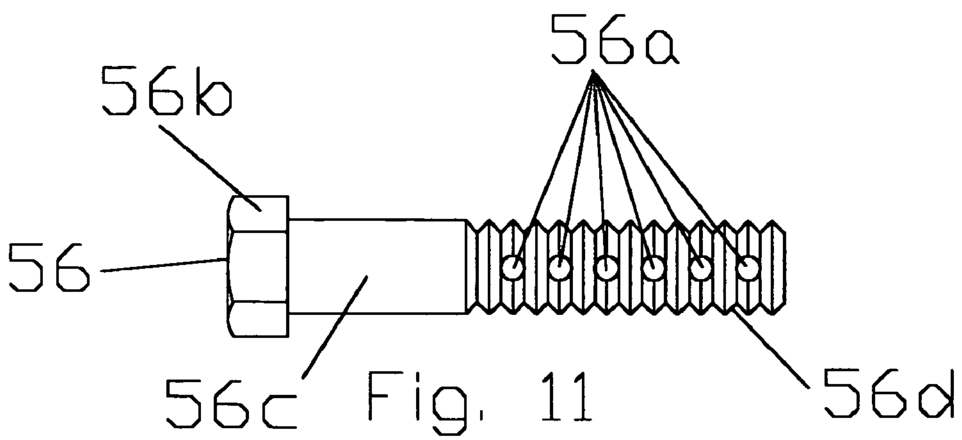
Figures 1, 11:
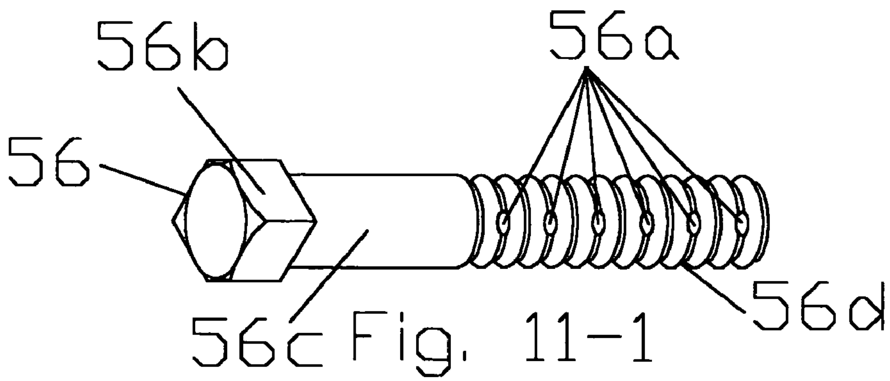
Figures 1, 12:
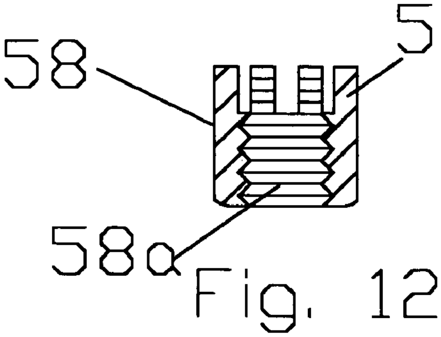
Figure 12:
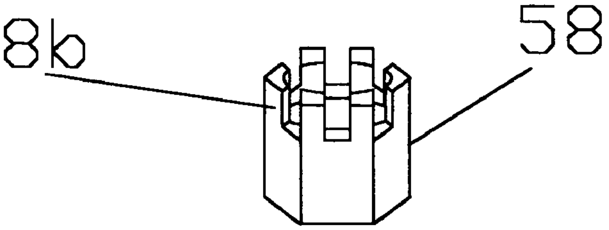
Figure 13:
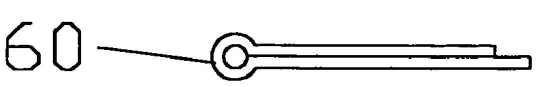
FIG. 13 shows a side view of a cotter pin.

FIGS. 11 to 11-1, 12 to 12-1 and 13 show another type of bolt which can be utilized to support bearing assembly 32. FIG. 11 and 11-1 show a drilled bolt 56 containing a plurality of holes 56A located within a threaded section 56D. Threaded section 56D joins a circular shaft 56C. Shaft 56C extends from a bolt head 56B. Threaded section 56D joins a crown nut 58. Crown nut 58 contains a plurality of spaced teeth 58B. Teeth 58B joins a cotter pin 60. Drilled bolt 56 is approximately 3" in length having a diameter of $\frac{1}{2}$". Holes 56A are typically $\frac{1}{8}$" in diameter. Threaded section 56D is approximately 1 and $\frac{1}{2}$" in length having a diameter of $\frac{1}{2}$". Shaft 56C is roughly $\frac{5}{8}$" in length with a diameter of $\frac{1}{2}$". Bolt head 56B is approximately $\frac{1}{4}$" in thickness with a diameter of $\frac{1}{2}$". Crown nut 58 is roughly $\frac{3}{4}$" in thickness with a diameter of $\frac{1}{2}$". Cotter pin 60 is approximately 1" in length having a diameter of $\frac{7}{64}$".

Figure 18:
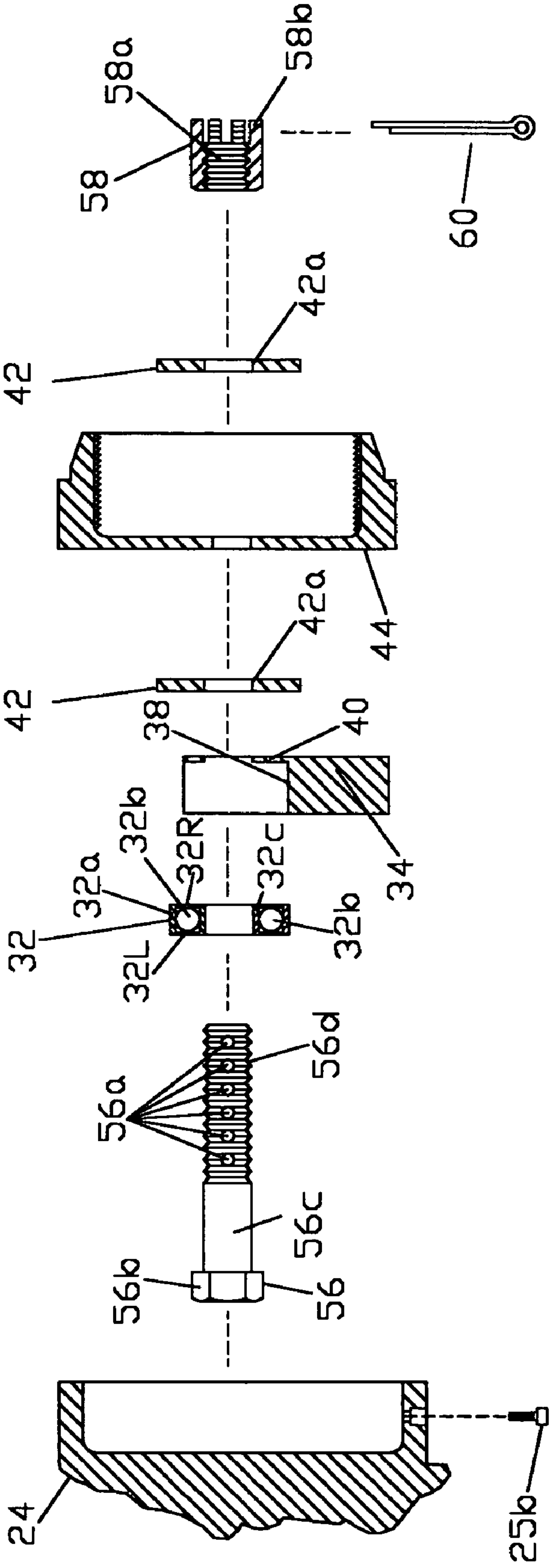
Figures 1, 18:
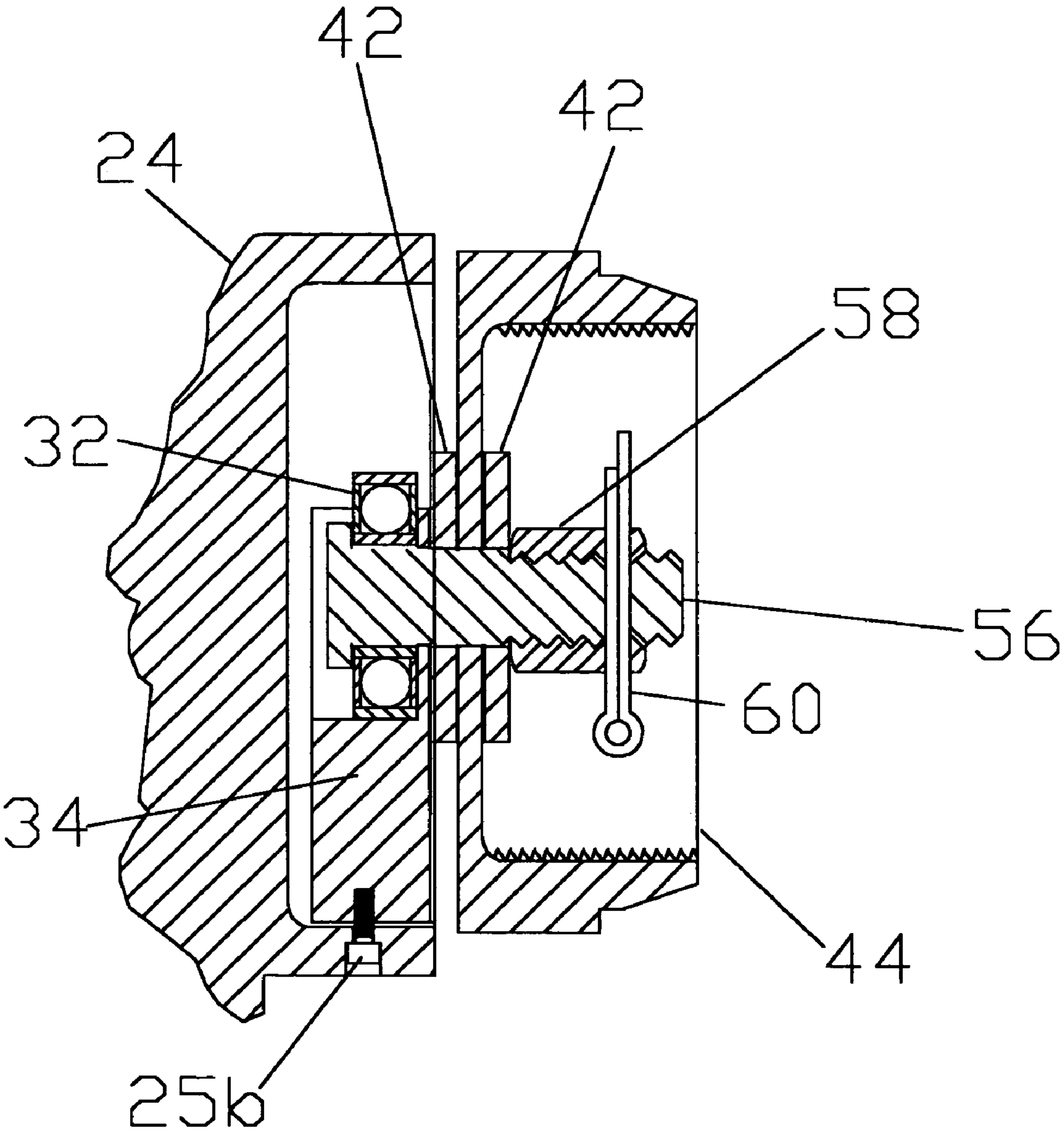

FIGS. 18 and 18-1 show bolt shaft 56C being constructed to adjoin the small enclosure 32C of bearing assembly 32 and the central openings of washer 42 and wheel cap 44. Shaft 56C extends from head 56B to provide axial support of bearing assembly 32. Threaded section 56D of drilled bolt 56 occupies threaded section 58A of nut 58. Nut 58A secures bearing assembly 32 and counterbalance 34 to wire wheel cap 44. Teeth 58B aligns cotter pin 60 to occupy one of holes 56A. Cotter pin 60 prevents nut 58 from loosening from threaded section 56D.

Figure 17:
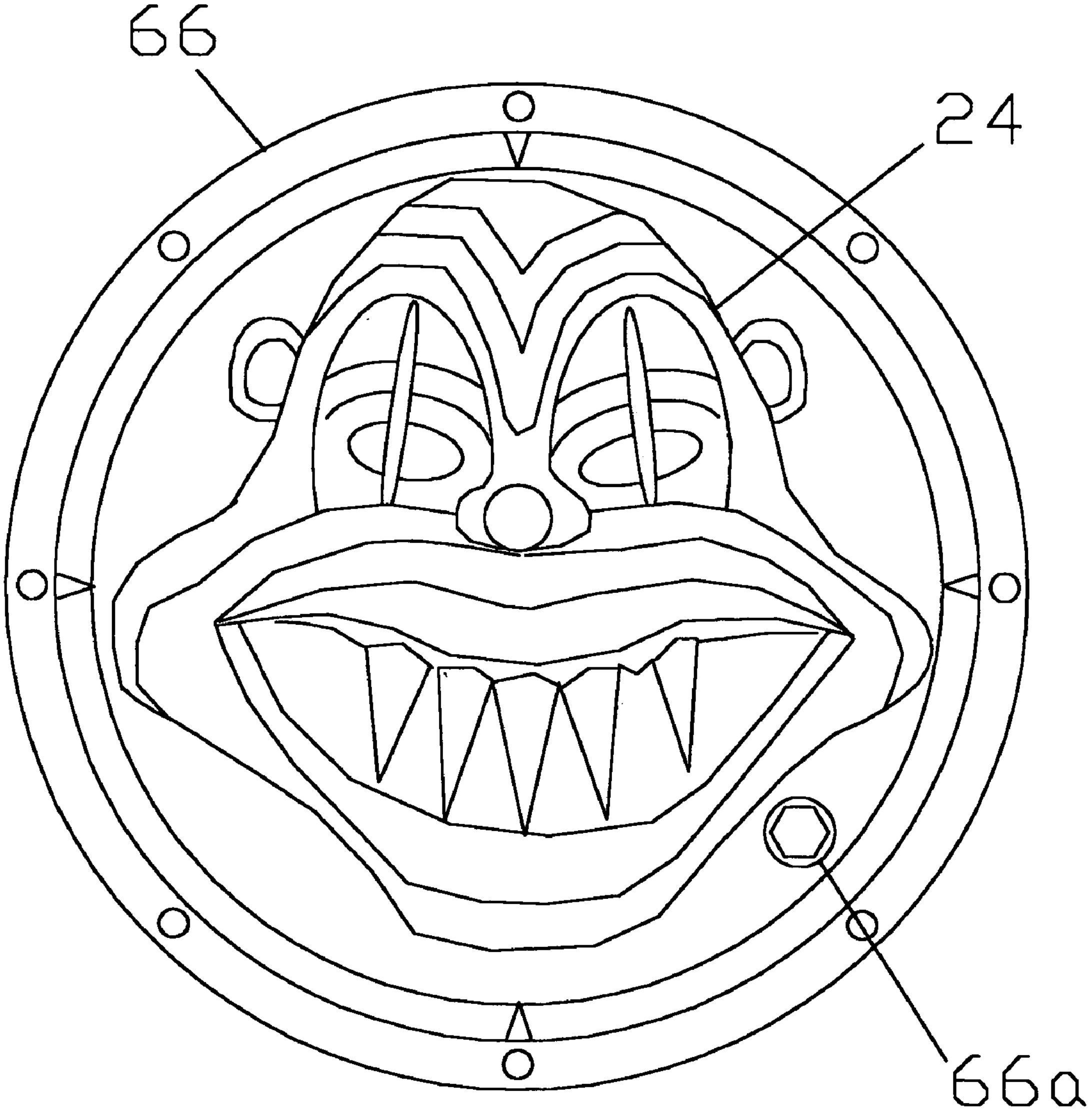
FIG. 17 shows a front view of the ornamental image constructed in accordance with a custom wheel center cap.
Figures 1, 17:
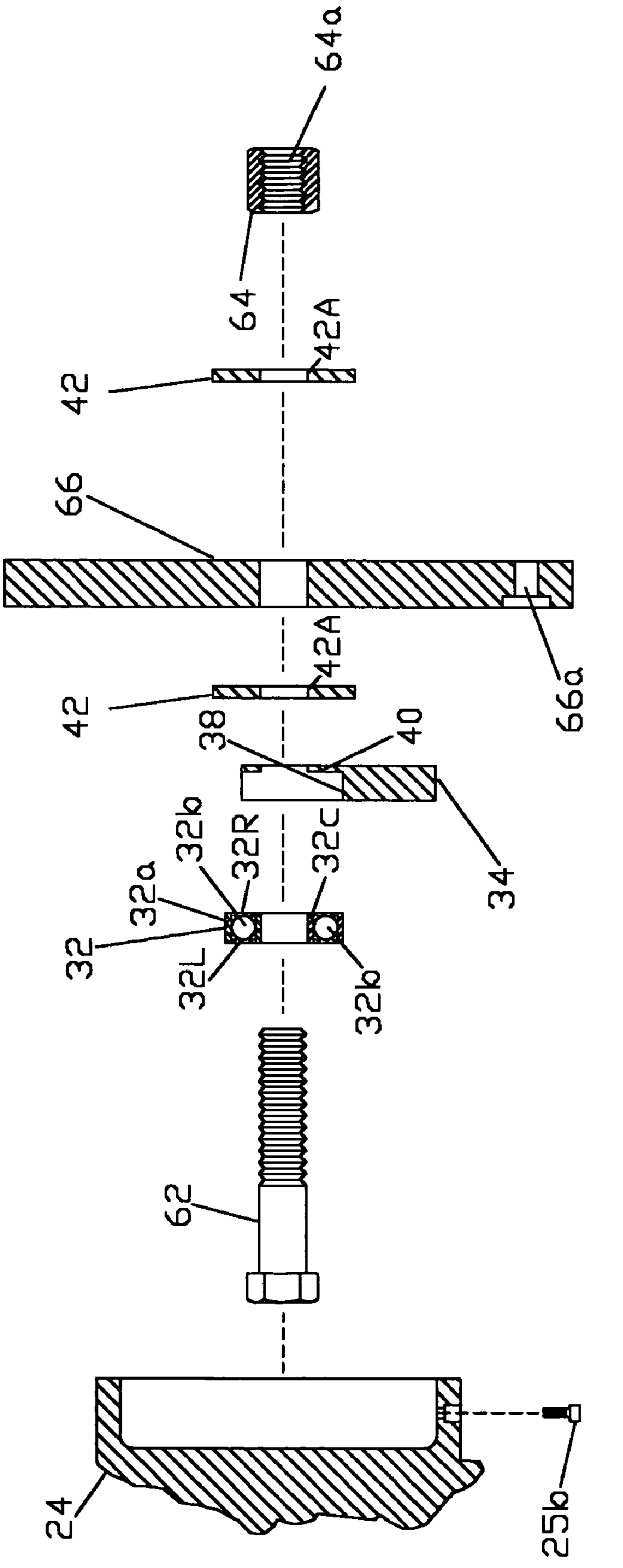
Figures 2, 17:
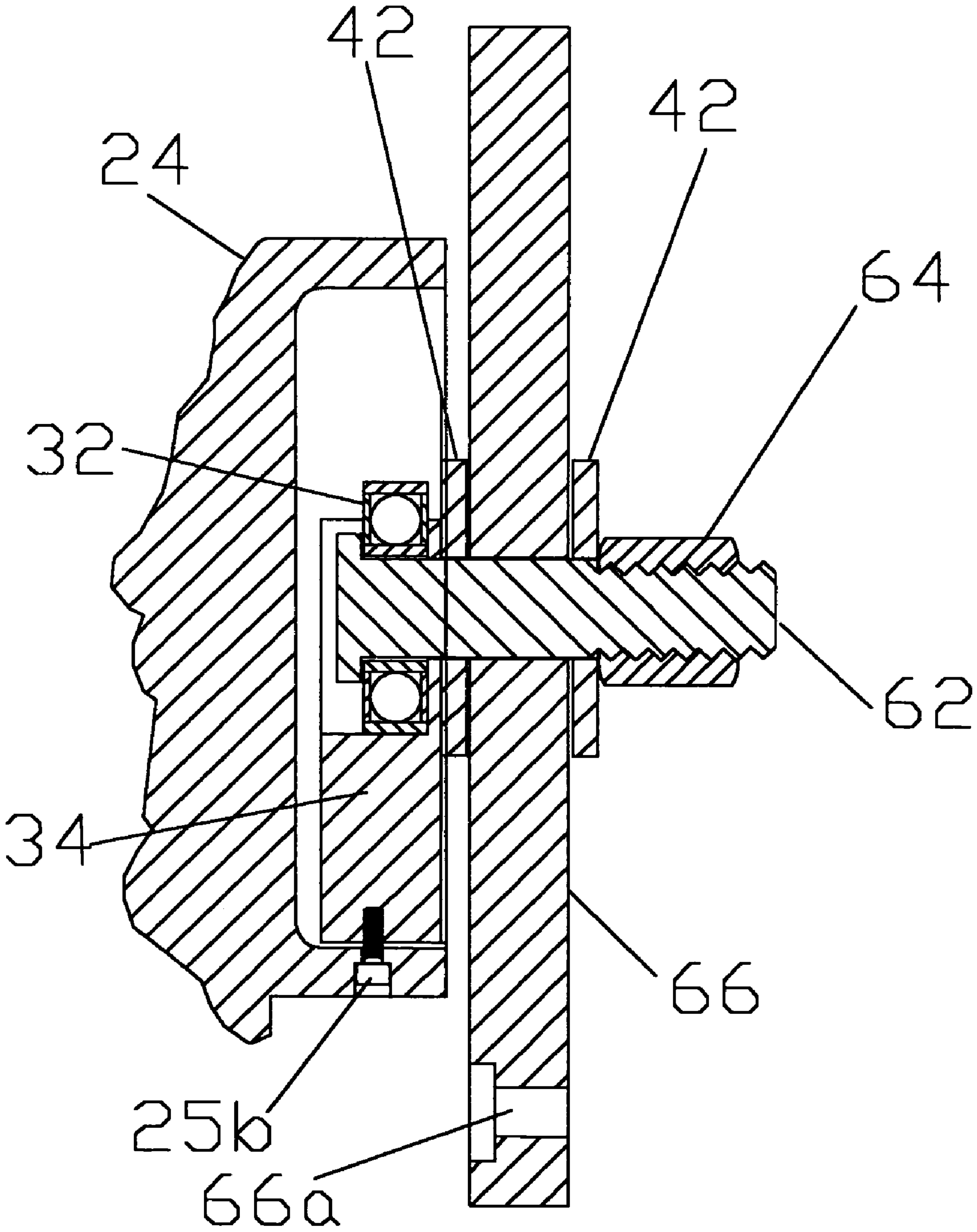

As stated earlier, ornament 24 can be used for additional wheel enhancement of present automoiles, semi-trailers, boat carrying trailers and golf cars. FIGS. 17 to 17-2 show front, exploded and assembled views of ornament 24 being constructed in accordance with a wheel center cap 66 commonly supplied on custom wheels. FIGS. 17-1 and 17-2 show bolt shaft 62B being constructed to occupy small enclosure 32C of bearing assembly 32 and the central openings of washer 42 and center cap 66.

Advantages

From the description above, a number of advantages of my wire wheel cap with combined non-rotatable image become evident:

(a) Producing a wire wheel cap with an image capable of constantly presenting itself would maximize the enhancement of their present appearance.

(b) Combining the aesthetic appearance of the wire wheel's plated spokes with a wire wheel cap comprising a non-rotatable image would move wire wheels to an astonishing new level.

(c) To supply a wire wheel cap with an endless selection of images or features, ranging from historic people, nature's animals, trademarks, logos, or personal requests.

(d) To produce a wire wheel cap for wire wheels that continuously exhibits natural expression of art, by using artist composed molds to create an asymmetrical images for the exposed section of the wheel cap.

(e) To provide a wire wheel cap containing a non-rotatable front section being comprised of the highly detailed images previously mentioned, which present day wire wheel manufacturers have failed to offer.

CONCLUSIONS, RAMIFICATIONS, AND SCOPE

Accordingly, the reader will perceive that the present invention is not limited to automobiles. It is adaptable to wire wheels supplied for semi-trailers, boat trailers, and golf cars. Furthermore, the non-rotatable wire wheel cap has the additional advantages in that Many other variations are possible. For example, it allows the ability to construct a cap that illustrates the countless images of beautiful animals that are in existence or extinction, to images of self portraits, as well as images of those who are known legends and heroes in western society or globally such as images of Presidents, famous people of Religions, Musicians, Athletes, Actors, Actresses, Artists, as well as images of passed loved ones.

It permits production of wire wheel caps with images consisting of metal rather than plastic material.

It allows the counterbalance housing to be constructed to correlate the design of the adjoining wheel. For example, if the wheel's design is comprised of five spokes, the housing may be designed to match.

It allows the elimination of the bearing assembly for placement of a bushing, to provide support of the device while freeing it from the wire wheel.

It admits the ornamental image and counterbalance to be constructed simultaneously having the counterbalance within the lowermost region of the ornament.

It permits the elimination of the spindle to utilize a standard bolt for adjoining the imaged section and the wire wheel cap.

It allows the elimination of the spindle for use of a standard bolt to adjoin the illustrated section and housing to present day center caps of custom wheels.

It allows potentiality for improvement by placing a spring loaded ring within the counterbalance housing, thereby increasing stability.

It permits the use of rhinestones to maximize the detailed features of the imaged section.

Although the above description contains many specificities, these should not be construed as limitations on the scope of the invention, but rather as an exemplification of one preferred embodiment thereof. For example, the illustrated section can be comprised of logos, trademarks, letters, numbers, or any feature requested thereon.

Accordingly, the scope of the present invention should be determined not by the embodiments illustrated, but by the appended claims and their legal equivalents.

I claim:

1. A wheel cap means mountable onto a wire spoked wheel of a vehicle wheel comprising: a wheel cap means for removably joining a central portion of a wire spoked wheel, thereby radially aligning said wheel cap with said wire spoked wheel; and a spindle supported by said wheel cap, a bearing assembly supported by said spindle, a counterbalance supported by said bearing assembly, the counterbalance having means for retaining said bearing assembly therein; and a housing means for receiving said counterbalance; and a section of said housing contains means for exhibiting a ornamental image; a bearing assembly supported by the spindle, the bearing assembly configured to prohibit rotational motion between the wheel cap and said ornamental image; whereby said ornamental image remains vertical and observable continuously as the vehicle is in motion; wherein said counterbalance comprises a bearing assembly housing configured to retain said bearing assembly and a circular ridge configured to prevent the counterbalance from departing the bearing assembly; wherein said counterbalance includes a plurality of threaded holes about the peripheral surface thereby allowing a screw for mechanically coupling said counterbalance with a ornament housing, wherein said ornament housing comprises a circular opening posteriorly for receiving said counterbalance and a semicircular ridge functioning as a rest for said counterbalance.

2. The wheel cap means of claim 1 wherein said wheel cap comprises a front section consisting of a flush solid face.

3. The wheel cap means of claim 2 further including a central opening within said solid face.

4. The wheel cap means of claim 1 wherein said spindle axially joins the central opening therein said solid face.

5. The wheel cap means of claim 4, wherein said spindle comprises a circular groove configured to encompass a snap ring.

6. The wheel cap means of claim 4, wherein said spindle provides support for centrally joining a opening of said bearing assembly.

7. The wheel cap means of claim 6 wherein said spindle supports said central opening of said bearing assembly thereby prohibiting rotary motion of said ornamental image as the vehicle progresses.

8. The wheel cap means of claim 1, further including a plurality of counterbored openings thereby allowing the placement of a screw to mechanically couple the housing and said counterbalance.

9. The wheel cap means of claim 1 wherein said prominent section of said housing comprises said ornamental image thereby displaying a design, brand name, label, emblem, and symbol.

10. The wheel cap means of claim 9 wherein said ornamental image is comprised of composed artistry.

* * * * *